United States Patent
Kupferschmidt et al.

(10) Patent No.: US 9,043,801 B2
(45) Date of Patent: May 26, 2015

(54) TWO-TIERED DYNAMIC LOAD BALANCING USING SETS OF DISTRIBUTED THREAD POOLS

(75) Inventors: Mark Gary Kupferschmidt, Rochester, MN (US); Paul Emery Schardt, Rochester, MN (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2019 days.

(21) Appl. No.: 12/014,208

(22) Filed: Jan. 15, 2008

(65) Prior Publication Data

US 2009/0183167 A1  Jul. 16, 2009

(51) Int. Cl.
*G06F 9/46* (2006.01)
*G06F 9/50* (2006.01)

(52) U.S. Cl.
CPC ...... *G06F 9/5027* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 6,542,920 B1 * | 4/2003 | Belkin et al. | 718/104 |
| 7,779,222 B1 * | 8/2010 | Lev et al. | 711/170 |
| 2002/0091004 A1 * | 7/2002 | Rackham | 472/60 |
| 2006/0075406 A1 * | 4/2006 | Sinha | 718/100 |
| 2006/0200327 A1 * | 9/2006 | Bordes | 703/6 |
| 2008/0021987 A1 * | 1/2008 | Bates et al. | 709/223 |

* cited by examiner

*Primary Examiner* — Gregory A Kessler
(74) *Attorney, Agent, or Firm* — Patterson & Sheridan, LLP

(57) ABSTRACT

By employing a two-tier load balancing scheme, embodiments of the present invention may reduce the overhead of shared resource management, while increasing the potential aggregate throughput of a thread pool. As a result, the techniques presented herein may lead to increased performance in many computing environments, such as graphics intensive gaming.

20 Claims, 20 Drawing Sheets

MACRO-DYNAMIC LOAD BALANCING

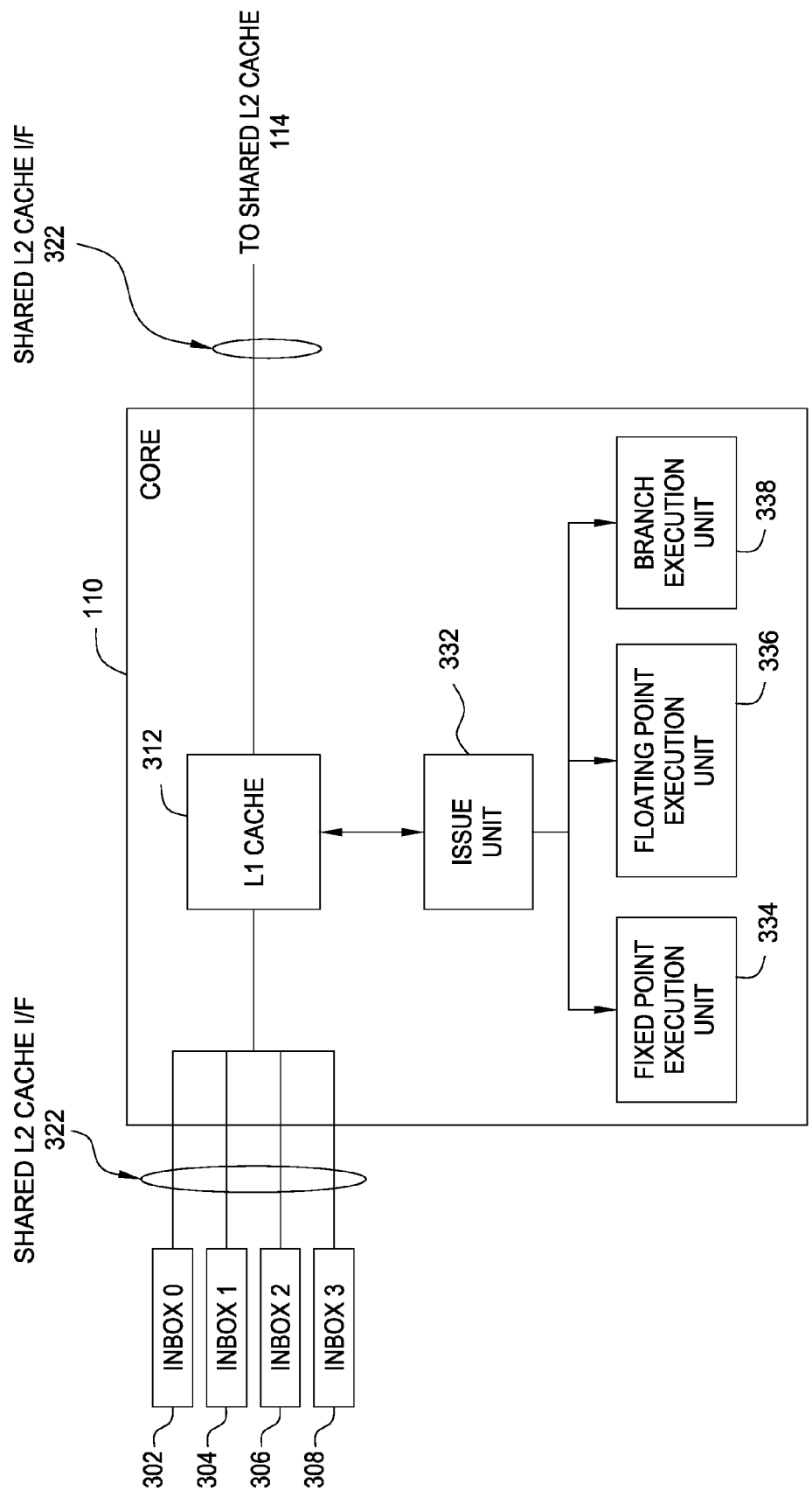

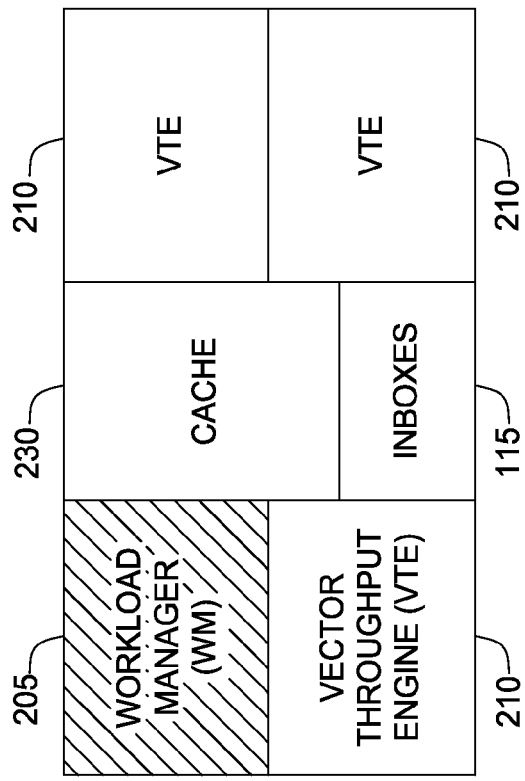
FIG. 8A
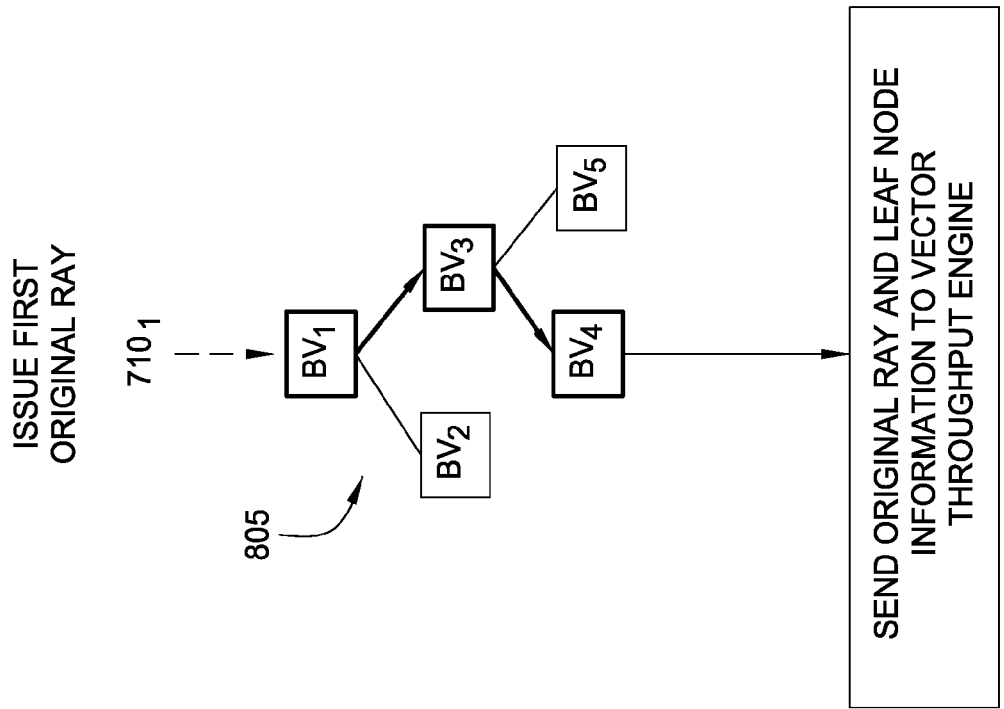

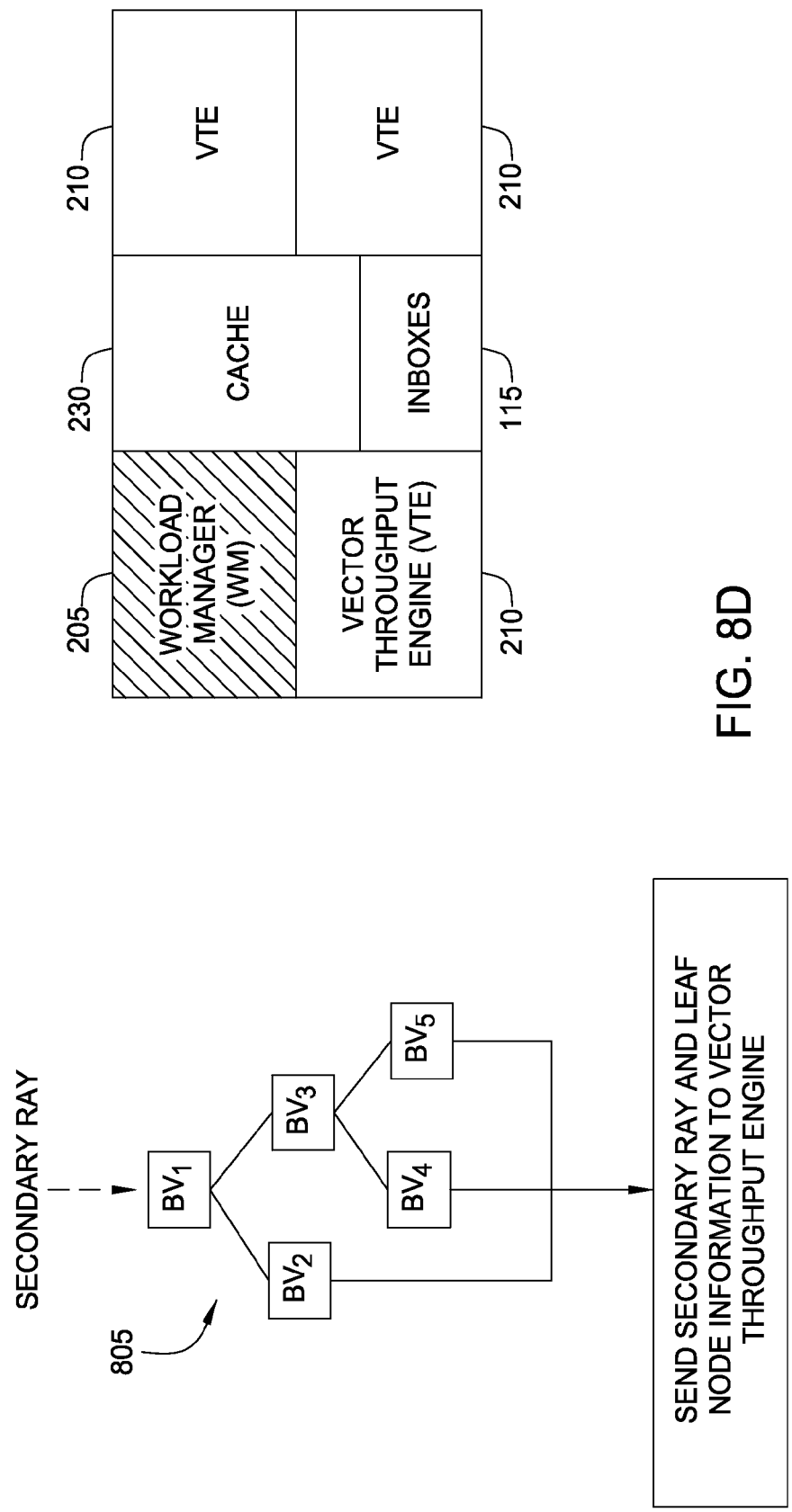

MACRO-DYNAMIC LOAD BALANCING

MACRO-DYNAMIC LOAD BALANCING

TWO-TIERED DYNAMIC LOAD BALANCING USING SETS OF DISTRIBUTED THREAD POOLS

BACKGROUND OF THE INVENTION

1. Field of the Invention

Embodiments of the invention generally relate to computer processors, and more specifically to dynamic load balancing in a massively threaded graphics processing environment.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two-dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two-dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two-dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

To address this problem and others, the software industry has developed applications with more than one thread of execution, or threaded applications. The use of two or more threads allows a program to fork (or split) itself into a plurality of simultaneously (or pseudo-simultaneously) running tasks. To optimize the performance of threaded applications, the industry has developed computers with processors with multiple processing cores which may be used to simultaneously process data from multiple threads of execution (e.g., from multiple programs, from multiple processes, and/or from multiple threads). Each processing core may itself be used to process multiple threads of execution, for example, by processing the threads simultaneously (simultaneous multithreading) or by processing each thread for a short amount of time (e.g., as determined by a priority) before processing a subsequent thread as known to those skilled in the art.

There is generally a desire to have as many processing cores as possible each concurrently processing as many threads as possible in order to obtain the greatest processing power and efficiency from the processor. For example, a plurality of threads may be used to execute an application such as a video game which performs three-dimensional graphics rendering, sound effects, physics simulations, player input/output, and other functions. To provide the most realistic experience to the video game player, there may be a desire to have each thread perform a given function (e.g., one thread may draw a three-dimensional scene, also referred to as rendering while another thread performs a physics calculation) requiring a certain amount of processing power for a set amount of time. For example, if the processor is being used to render a three-dimensional sequence of an action being performed by a video game player in a video game, there may be a desire to render each picture (referred to as a frame) in the sequence quickly such that the action appears to occur smoothly (e.g., if the action being performed by a video game player is a jump, there may be a desire for the jump to appear smoothly up and down as would a real-life jump).

In order to maintain simultaneously executing threads, the processor may be configured to efficiently retrieve data and/or instructions for each executing thread from the computer's main memory. In some cases, the retrieved data and instructions may be placed in one or more small memories referred to as caches which may be located on the same chip as the processor. The caches may also be arranged hierarchically, for example, such that a first cache (referred to as an level two cache, or L2 cache) is shared by each processing core in a processor while multiple smaller caches (referred to as level one, or L1 caches) are provided for a given processing core or group of processing cores. Where data and instructions requested by a thread are not available in one of the processor caches, the processor may request the data and instructions from the main memory.

While the requested data and instructions are retrieved from main memory, execution of the thread requesting the data and instructions may be temporarily paused by the processing core to provide time for the request to be fulfilled. In some cases, other threads may be executed while the thread requesting data and instructions is paused. However, if too many threads are paused waiting for data and instructions, one or more processing cores in the processor may remain idle while the data and instructions are retrieved from the main memory.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 3A-3C are block diagrams illustrating aspects of memory inboxes according to one embodiments of the invention.

FIGS. 8A-8D illustrate a method of performing ray tracing, according to one embodiment of the invention.

DETAILED DESCRIPTION OF THE PREFERRED EMBODIMENTS

Figure 1:
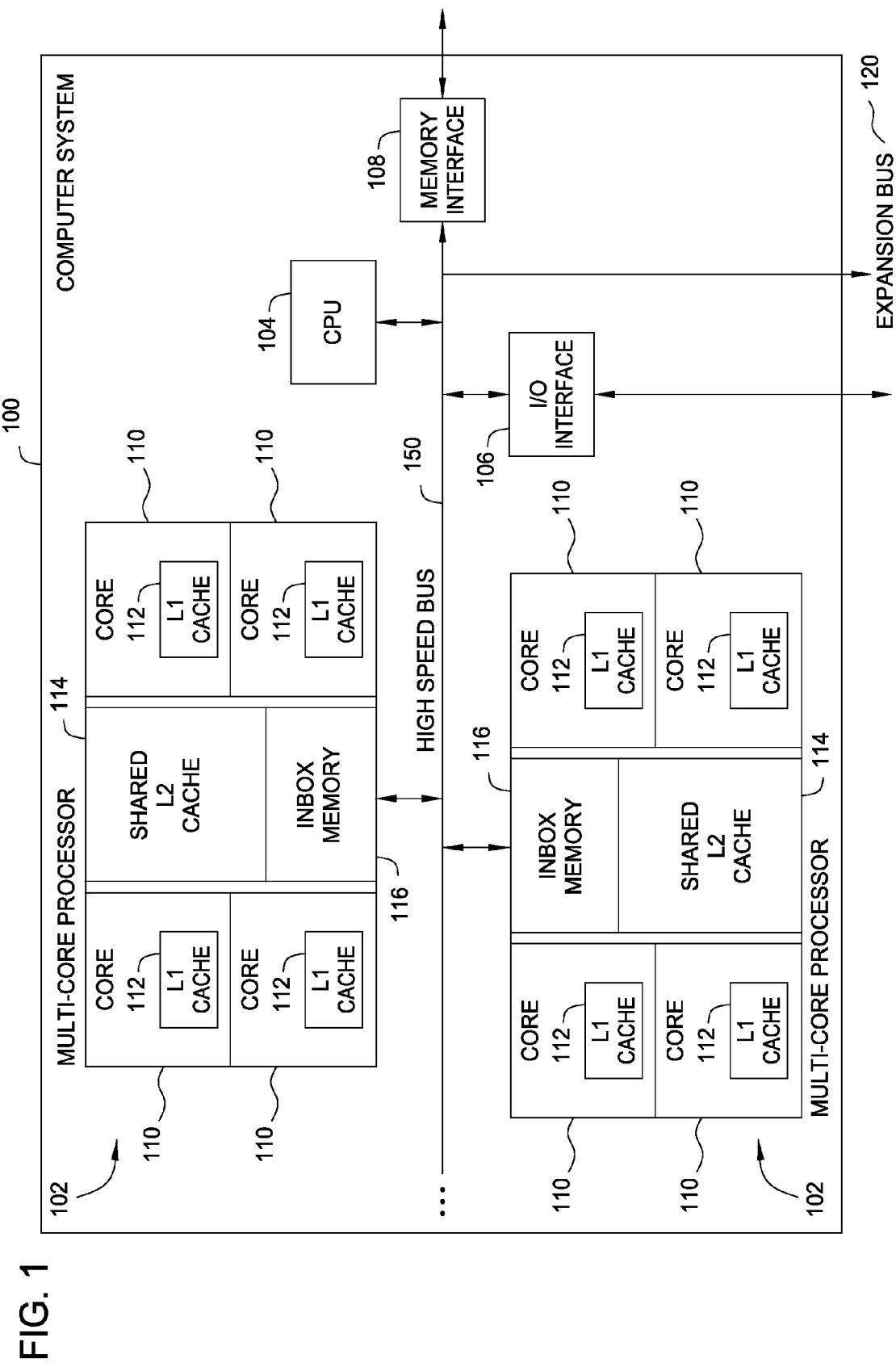
FIG. 1 illustrates a computer system, according to one embodiment of the invention.

Embodiments of the current invention provide a method and apparatus for utilizing memory. The method includes an implementation of macro-dynamic load balancing, as well as, an employment of micro-dynamic load balancing. Macro-dynamic load balancing includes determining the optimal way to distribute work among the sets of thread pools, by selectively increasing or decreasing the number of thread pool sets, the size of each thread pool set, or the work flow provided to each thread pool set. While, micro-dynamic load balancing consist of dividing a plurality of threads into sets of thread pools based on a plurality of different thread "types," wherein each thread pool may have a configurable and dynamic number of threads that share a work set to be completed. As each thread completes a task, the thread retrieves an additional task from the set of shared work.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module). Furthermore, while described below with respect to a processor having multiple processor cores and multiple L1 caches, embodiments of the invention may be utilized with any processor which utilizes a cache, including processors which have a single processing core. In general, embodiments of the invention may be utilized with any processor and are not limited to any specific configuration.

Program Products Used with a Computer System

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Computer System

FIG. 1 is a block diagram depicting the computer system 100 according to one embodiment of the invention. The system 100 may contain one or more multi-core processors 102. Each multi-core unit 102 may include multiple cores 110 each arranged around a shared level two cache (L2 cache) 114. The shared L2 cache 114 may include a portion of memory, referred to herein as inbox memory 116, which, as described below, may be used to manage memory access for threads being executed by the cores 110 in a multi-core unit 102. Each core 110 may also include a level one cache (L1 cache) 112 which, in some cases, may be used exclusively by that core 110.

In some cases, the system 100 may also include a further central processing unit (CPU) 104 which may provide additional processing functionality. The system 100 may also include an input/output (I/O) interface 106 and a memory interface 108 which may be used to communicate with external I/O device and additional system memory, respectively. Each of the components within the system may communicate across a high speed processor bus 150. The system 100 may also include an expansion bus 120 which may be used to connect the multi-core processor to additional system components. While depicted as separate components of a computer system 100, in some cases, two or more of the items depicted in FIG. 1 may be combined as part of a system on a chip (SOC).

Each processor core 110 may contain a plurality of processing threads and a core cache (e.g., an L1 cache). The processing threads located within each processor core 110 may have access to the shared L2 cache 114.

The processor cores 110 may also have access to a plurality of inboxes within the inbox memory 116. The inboxes may be memory mapped address space. The inboxes may be mapped to the processing threads located within each of the processor cores 110. Each thread located within the processor cores 110 may have a memory mapped inbox and access to all of the other memory mapped inboxes. The inboxes may make up a low latency and high bandwidth communications network used by the processor cores 110.

The processor cores 110 may use the inboxes as a network to communicate with each other and redistribute data processing work amongst the processor cores 110. For some embodiments, separate outboxes may be used in the communications network, for example, to receive the results of processing by processor cores 110. For other embodiments, inboxes may also serve as outboxes, for example, with one processor core 110 writing the results of a processing function directly to the inbox of another processor core 110 that will use the results.

The aggregate performance of an image processing system may be tied to how well the processor cores 110 can partition and redistribute work. The network of inboxes may be used to collect and distribute work to other processor cores 110 without corrupting the shared L2 cache 114 with processor cores 110 communication data packets that have no frame to frame coherency. An image processing system which can render many millions of triangles per frame may include many processor cores 110 connected in this manner.

As described further below with respect to FIG. 2, in one embodiment of the invention the threads of one processor core 110 may be assigned to a workload manager. An image processing system may use various software and hardware components to render a two-dimensional image from a three-dimensional scene. As described further below with respect to FIG. 6, according to one embodiment of the invention an image processing system may use a workload manager to traverse a spatial index with a ray issued by the image processing system. A spatial index, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads on the multi-core processor may be vector throughput engines. After a workload manager determines a ray-bounding volume intersection, the workload manager may issue (send), via the inboxes, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
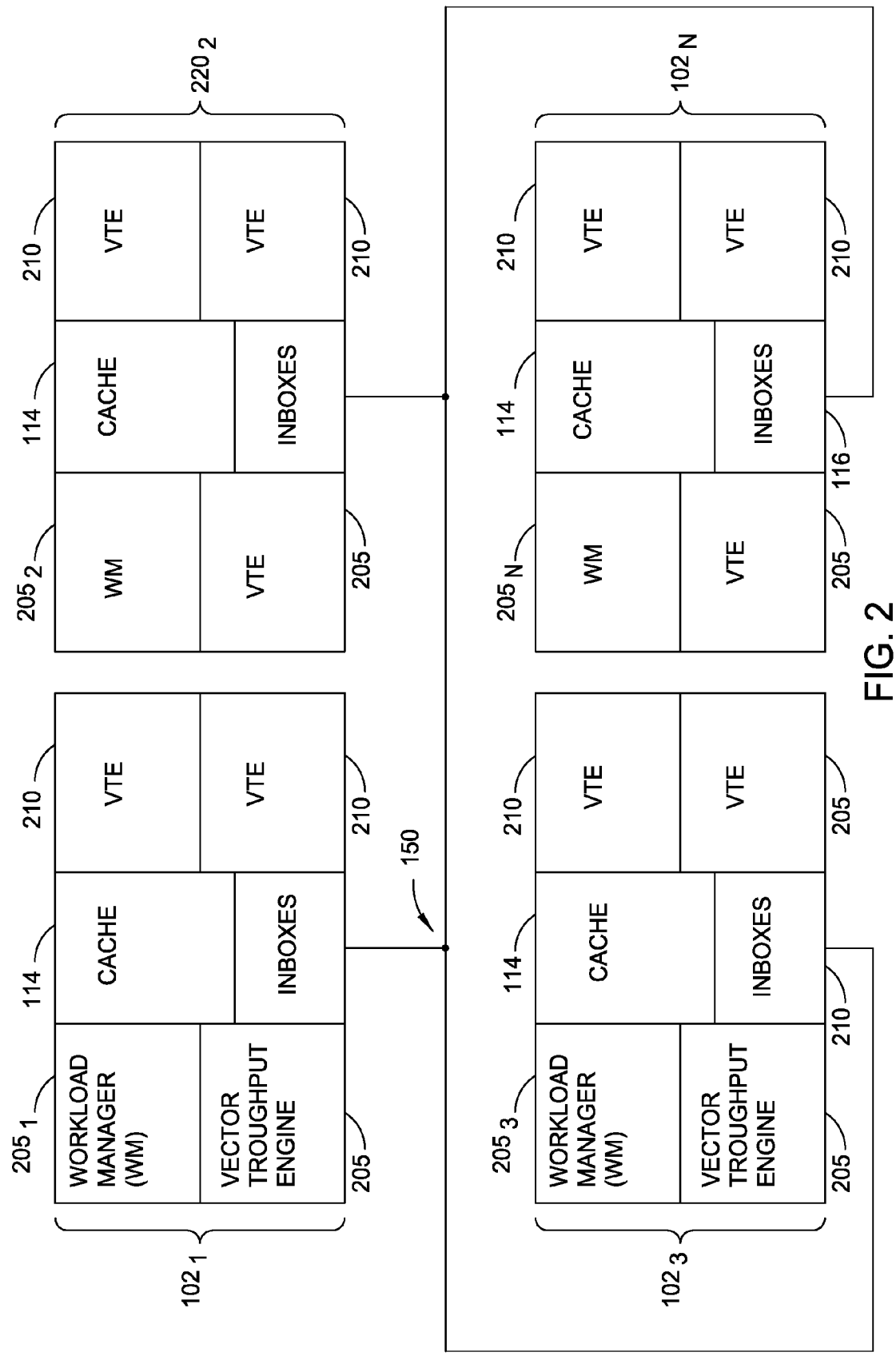
FIG. 2 illustrates a multiple core processing element network, according to an embodiment of the invention.

FIG. 2 illustrates a network of multiple core processing elements 200, according to one embodiment of the invention. FIG. 2 also illustrates one embodiment of the invention where the threads of one of the multiple core processors 102 are a workload manager 205. Each multiple core processor $102_{1-N}$ in the network of multiple core processors 200 may contain one workload manager $205_{1-N}$, according to one embodiment of the invention. Each multiple core processor 102 in the network of multiple core processing elements 200 may also contain a plurality of vector throughput engines 210, according to one embodiment of the invention.

The workload managers $205_{1-N}$ may use a high speed bus 150 to communicate with other workload managers $105_{1-N}$ and/or vector throughput engines 210 of other multiple core processors 102, according to one embodiment of the invention. Each of the vector throughput engines 210 may use the high speed bus 150 to communicate with other vector throughput engines 210 or the workload managers 205. The workload manager processors 205 may use the high speed bus 150 to collect and distribute image processing related tasks to other workload manager processors 205, and/or distribute tasks to other vector throughput engines 210. The use of a high speed bus 150 may allow the workload managers $205_{1-N}$ to communicate without affecting the caches 114 with data packets related to workload manager 205 communications.

Low-Latency High-Bandwidth Communications Network

As described above, the aggregate performance of an image processing system may be tied to how well the processor cores can partition and redistribute work. According to one embodiment of the invention, memory space within a cache, referred to as a memory inbox, may be used to distribute work to a single processor thread. In an image processing system using a plurality of processors each having a plurality of threads, the collection of inboxes together may be referred to as a low-latency high-bandwidth communications network.

In multithreading processor such as the processor core 110 illustrated in FIG. 1, a memory inbox may be assigned to a given thread (referred to herein as the owner thread). In one embodiment of the invention, the memory space for the inbox may be allocated from the shared L2 memory cache 114 exclusively to the owner thread. By exclusively assigning the memory space in a cache to the owner thread, the owner thread may maintain enough memory space to cache its own instructions and data without other having other competing threads displace the owner thread's instructions and data. Thus, the memory inbox may improve execution of the owner thread by maintaining the owner thread's data and instructions in the assigned inbox portion of the cache and reducing the possibility of stalling the owner thread while data and instructions for the owner thread are retrieved from higher levels of memory. Furthermore, by assigning the memory space in a cache to the owner thread, data or instructions intended for the targeted thread may be stored only in an inbox allocated to the thread. Thus, data or instructions intended for the targeted thread are not stored throughout the shared L2 memory cache 114, rather only in the inbox allocated to the targeted thread.

Furthermore, the inbox memory may be used by other threads to efficiently communicate with the owner thread. For example, where another thread has data and/or instructions which are to be provided to the owner thread for an inbox, the other thread may send the data and/or instructions to the inbox where the data and/or instructions may be retrieved by the owner thread. Similarly, in some cases, the owner thread may use the inbox as an outbox to communicate information with other threads. For example, to communicate the information with another thread, the owner thread may place the information in the inbox and send a notification to the other thread indicating the location of the data and/or instructions, thereby allowing the other thread to retrieve the information. Optionally, the owner thread may provide the information directly to the inbox of the other thread. Thus, the inbox memory may be used to simplify communication between a sending and a receiving thread while preventing displacement of data and/or instructions being used by other threads.

Figure 3A:
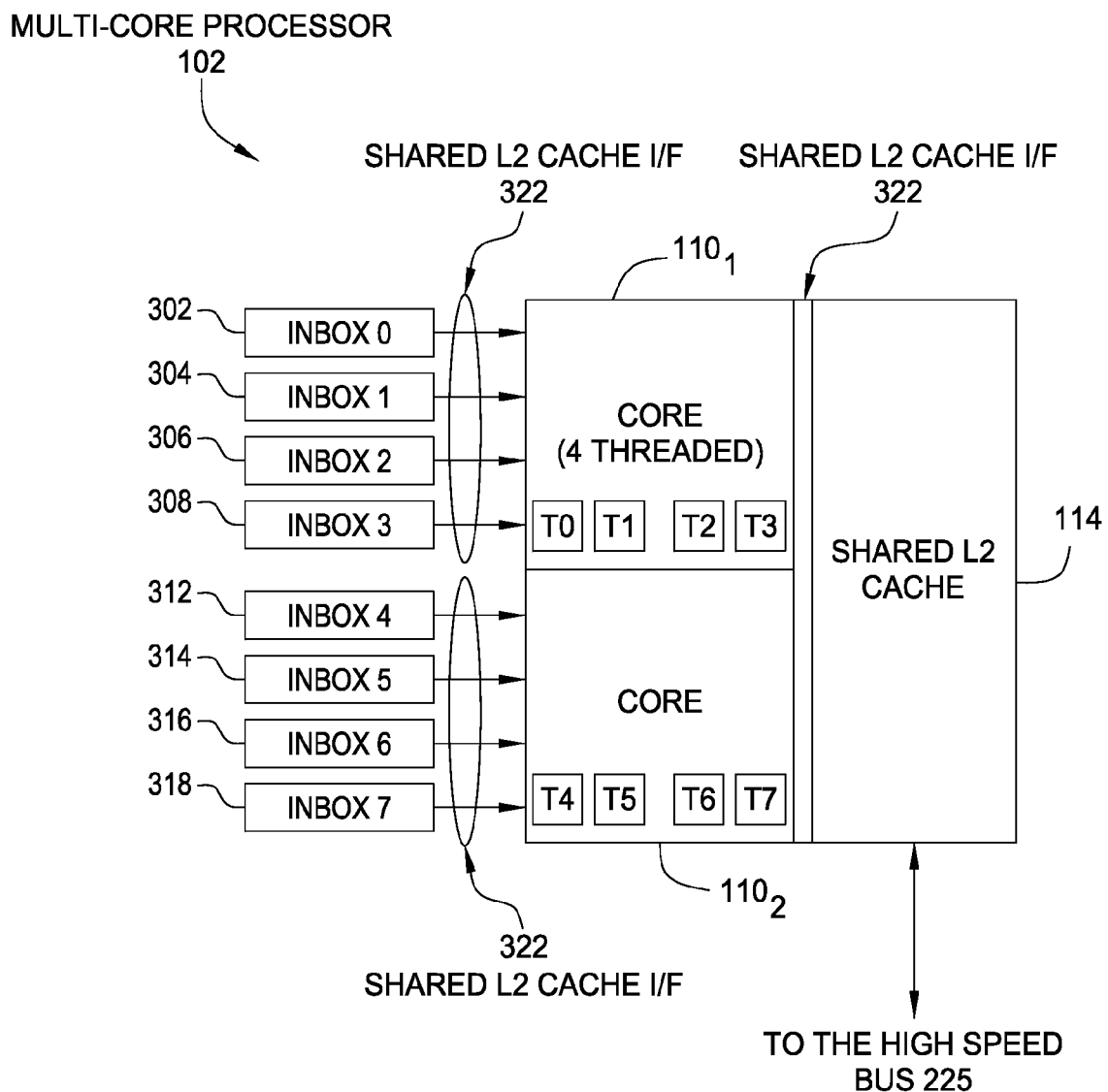

FIG. 3A is a block diagram of memory inboxes 302 ... 318 in a multi-core processor element 100 according to one embodiment of the invention. The depiction of the memory inboxes 302 ... 318 is intended to be a conceptual view and therefore is not limited to any particular physical configuration. As depicted, threads (e.g., threads T0-T7) executing in each core (e.g., the processor core $110_{1-2}$) may have access to the shared L2 cache 114 via a shared L2 cache interface 322. Furthermore, the L2 cache interface 322 may also be used by the threads T0 ... T7 to access the corresponding memory inboxes 302 ... 318. As described above, in some cases, each inbox 302 ... 318 may be assigned to a corresponding thread T0-T7. Thus, Inbox 0 302 may be assigned to thread T0 and so on. As described below, by assigning a given inbox to a given thread, access to the assigned inbox may be unrestricted with respect to the owner thread while access by other threads may be restricted. Exemplary restrictions are described below in greater detail.

FIG. 3B is a block diagram depicting the path of data from memory inboxes (e.g., inboxes 302 ... 308) and the shared L2 cache 114 transmitted to and from a processing core. As described above, both the memory inboxes 302 ... 308 and the shared L2 cache 114 may be accessed via the shared L2 cache interface 322. Where a thread being executed in the processor core 110 retrieves data from an inbox 302 ... 308 or from the shared L2 cache 114, the retrieved data may be placed in the L1 cache 312 for the processor core 110. Instructions for the thread may be issued from an issue unit 332. In some cases, the processor core 110 may be configured to execute multiple threads concurrently. Thus, the issue unit 332 may be configured to issue instructions for multiple threads. In some cases, the processor core 110 may provide multiple execution units 334 ... 338 which may be used to concurrently execute threads in the processor core 110. The execution units 334 ... 338 may include a fixed point execution unit 334, a floating point execution unit 336, and a branch execution unit 338.

In some cases, a thread may update or produce data which is to be accessed later (e.g., by the same thread or by another thread). Where the updated data is to be accessed later, the thread may place the updated data in an L1 cache 312. Furthermore, where desired, the updated data may also be placed in the L2 cache 114 or in an inbox 302 ... 308 for the updating thread via the shared L2 cache interface 322. In some cases, as described above, direct access to a given inbox (e.g., inbox 0 302) via the shared L2 cache interface 322 may be limited to the thread (e.g., thread T0) which owns the given inbox.

In one embodiment of the invention, memory space within a memory inbox may be mapped to a global memory address (e.g., all levels of memory including the L1 cache 312, L2 cache 114, and main memory as well as all threads may use the same global memory address to access a given memory inbox). Thus, in one embodiment of the invention, to access the inbox memory space, the owner thread may merely read or write the desired information to a global memory address corresponding to the inbox memory space. A thread which does not own the memory inbox and which attempts to directly access the inbox via the global memory address, may have access to the inbox denied. Other forms of access may instead be provided to other non-owning threads, e.g., via packetized messages sent to the inbox.

Also, in one embodiment of the invention, information being stored in a memory inbox may not be cacheable. For example, while information in the L1 cache 312, L2 cache 114, and other memory level may be automatically cached by the multi core processing element 102 such that information requested from a given memory address may be automatically fetched from main memory and maintained in one of the cache levels 312, 114 while being accessed. In contrast, the globally addressable memory in a given inbox may only be located in the inbox and may not be moved between different levels of the memory hierarchy (e.g., the main memory, the shared L2 cache memory 114 or the L1 cache memory) without being copied to a new address space outside of the inbox. Thus, accesses to an inbox by an owner thread may be performed quickly and directly to the inbox memory without waiting for information to be fetched from another level of the memory hierarchy and/or translated during fetching. The non-cacheability of inbox memory may also apply with respect to packetized access of the inbox. Furthermore, in an alternate embodiment of the invention, information stored in the inbox may be cached in other levels of the memory hierarchy.

Assignment of Memory Inboxes

Figure 3C:
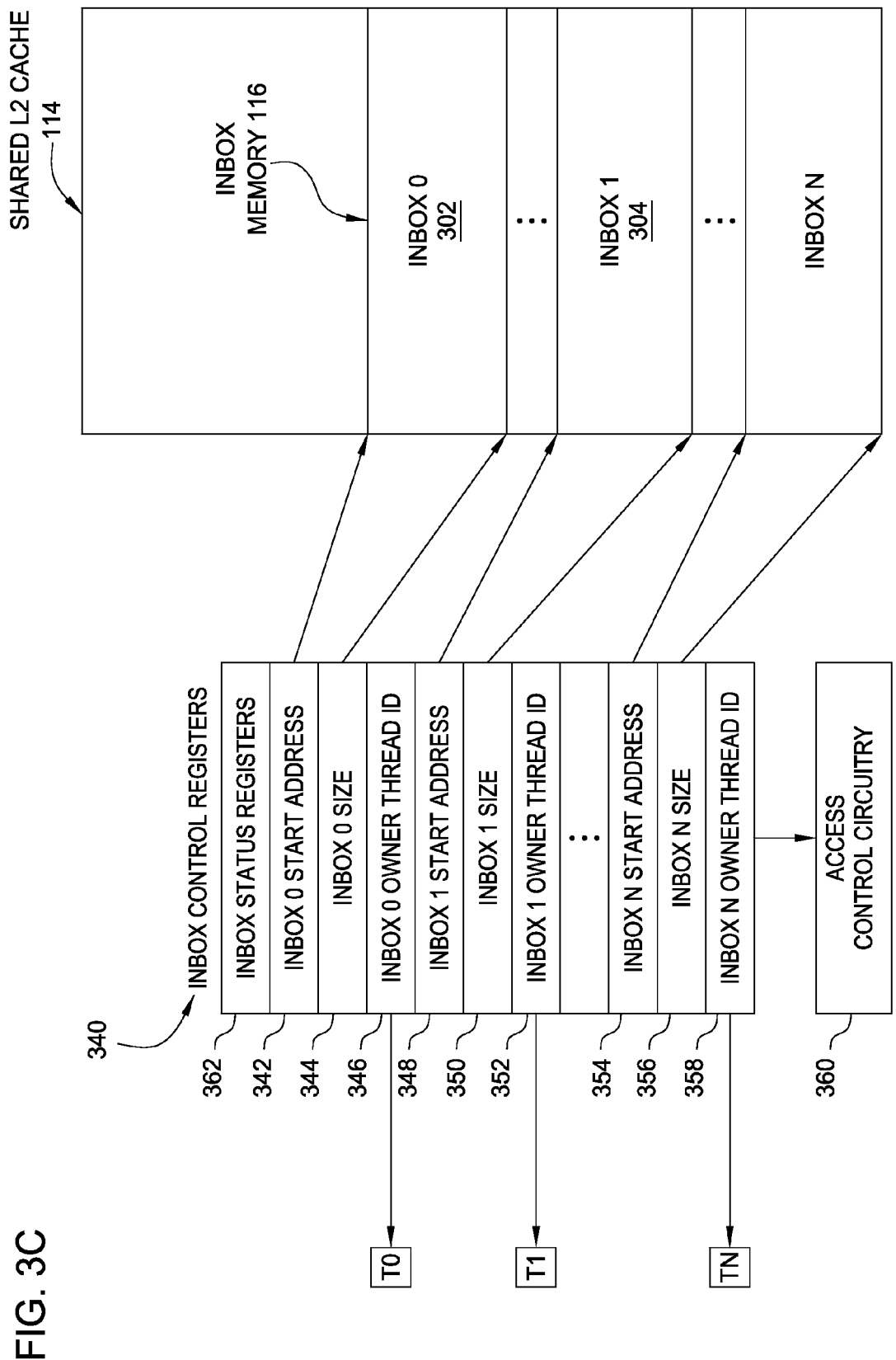

In one embodiment of the invention, memory inboxes may be provided from the shared memory cache 114 (e.g., a portion of the L2 cache 114 may be reserved for the inbox memory 116). FIG. 3C is a block diagram depicting inbox memory 116 partitioned from the shared L2 cache 114 according to one embodiment of the invention.

As depicted, the size and location of each inbox 302, 304, etc. may be controlled by inbox control registers 340. The status of each inbox 302, 304, etc. (e.g., enabled or disabled) may be indicated and/or modified via inbox status registers 362. In one embodiment, access to the inbox control registers 340 may be unrestricted. Optionally, in some cases, access to the inbox control registers may be limited, for example, to a subset of approved threads (e.g., the owner thread, a parent of the owner thread, a specially designated control thread, and/or an operating system kernel thread). In one embodiment, the inbox control registers 340 may include a start address register 342, 348 . . . 354, a size register 344, 350 . . . 356, and an owner thread identification register 346, 352 . . . 358.

In one embodiment, the start address registers 342, 348 . . . 354 may indicate a start address for each inbox 302, 304, etc. The size registers 344, 350 . . . 358 may indicate the size of a corresponding inbox 302, 304, etc. The memory space for an inbox may thus occupy each address beginning from the corresponding start address and ranging through the indicated size of the inbox. The size may be indicated in any manner, for example, as an absolute size in bytes or as an integer multiple of a fixed size (e.g., the size in the size registers 344, 350 . . . 358 may indicate the size in kilobytes).

In one embodiment, the owner thread identification register 346, 352 . . . 358 may identify which thread (e.g., thread T0, T1 . . . TN) owns a given inbox 302, 304, etc. While depicted with respect to threads and corresponding inboxes 1, 2 . . . N, embodiment of the invention may be used with any type of thread and/or inbox identifier (e.g., a number, an address, etc.). In one embodiment of the invention, the inbox identifier register may be used to restrict direct access to memory addresses within the corresponding inbox to the owner thread. In some cases, direct access may also be allowed by a limited selection of other threads, such as, for example, a parent thread of the owner thread, a specified control thread, and/or an operating system kernel thread. In one embodiment, access control circuitry 360 may be used to provide the restricted access.

By assigning portions of the shared memory cache 114 to the inboxes a low-latency high-bandwidth communications network may be formed. The remaining portion of the shared memory cache 114 may remain unassigned and, thus, available to store information which does not relate to communications between processing threads. The remaining portion of the shared memory cache 114 may be used to store geometry and data structures which are used by the image processing system to perform ray tracing (described further below with respect to FIGS. 4 and 5).

A benefit of using only the inboxes for communications between processing threads and using the remaining portion of the shared memory cache 114 to store geometry and data structures is that no matter how much communications related information is passed through the inboxes, it will not consume the entire memory cache. Thus, as will be described further below, communications related information will not displace the geometry and data structures stored within the remaining portion of the shared memory cache 114. Therefore, data which is likely to be reused when tracing subsequent rays or rendering subsequent frames (object geometry and data structures) may remain in the cache, while data which is unlikely to be reused when tracing subsequent rays or rendering subsequent frames (data processing work) will not remain in the cache.

An Exemplary Three-Dimensional Scene

Figure 4:
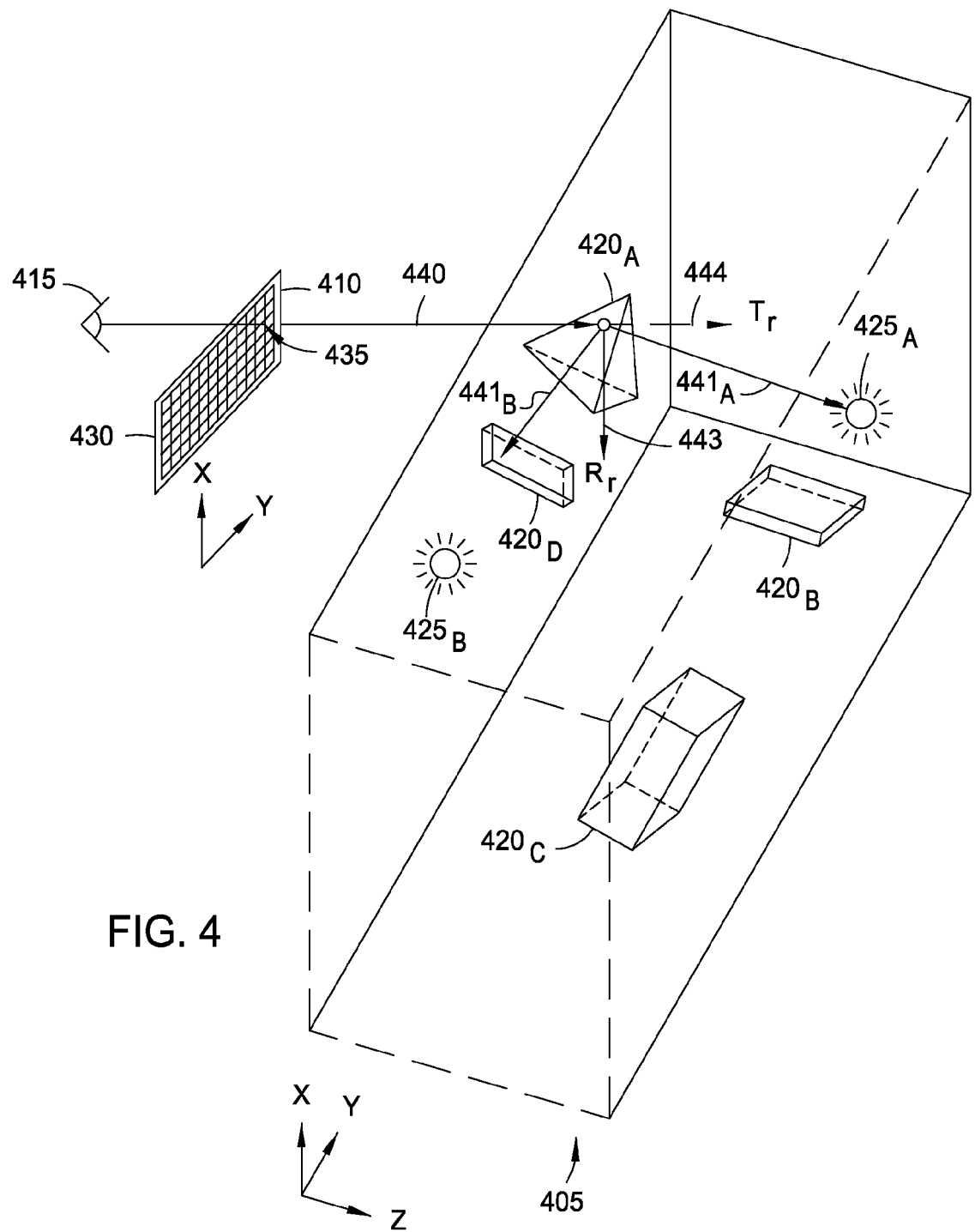
FIG. 4 is an exemplary three-dimensional scene to be rendered by an image processing system, according to one embodiment of the invention.

FIG. 4 is an exemplary three-dimensional scene 405 to be rendered by an image processing system. Within the three-dimensional scene 405 may be objects 420. The objects 420 in FIG. 4 are of different geometric shapes. Although only four objects 420 are illustrated in FIG. 4, the number of objects in a typical three-dimensional scene may be more or less. Commonly, three-dimensional scenes will have many more objects than illustrated in FIG. 4.

As can be seen in FIG. 4 the objects are of varying geometric shape and size. For example, one object in FIG. 4 is a pyramid $420_A$. Other objects in FIG. 4 are boxes $420_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 405 are light sources $425_{A-B}$. The light sources may illuminate the objects 420 located within the scene 405. Furthermore, depending on the location of the light sources 425 and the objects 420 within the scene 405, the light sources may cause shadows to be cast onto objects within the scene 405.

The three-dimensional scene 405 may be rendered into a two-dimensional picture by an image processing system. The image processing system may also cause the two-dimensional picture to be displayed on a monitor 410. The monitor 410 may use many pixels 430 of different colors to render the final two-dimensional picture.

One method used by image processing systems to rendering a three-dimensional scene 420 into a two-dimensional picture is called ray tracing. Ray tracing is accomplished by the image processing system "issuing" or "shooting" rays from the perspective of a viewer 415 into the three-dimensional scene 420. The rays have properties and behavior similar to light rays.

One ray 440, that originates at the position of the viewer 415 and traverses through the three-dimensional scene 405, can be seen in FIG. 4. As the ray 440 traverses from the viewer 415 to the three-dimensional scene 405, the ray 440 passes through a plane where the final two-dimensional picture will be rendered by the image processing system. In FIG. 4 this plane is represented by the monitor 410. The point the ray 440 passes through the plane, or monitor 410, is represented by a pixel 435.

As briefly discussed earlier, most image processing systems use a grid 430 of thousands (if not millions) of pixels to render the final scene on the monitor 410. Each individual pixel may display a different color to render the final composite two-dimensional picture on the monitor 410. An image processing system using a ray tracing image processing methodology to render a two-dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 435 in the two-dimensional picture, the image processing system must determine if the ray 440 intersects an object within the scene. If the ray does not intersect an object within the scene it may be assigned a default background color (e.g., blue or black, representing the day or night sky). Conversely, as the ray 440 traverses through the three-dimensional scene the ray 440 may strike objects. As the rays strike objects within the scene the color of the object may be assigned the pixel through which the ray passes. However, the color of the object must be determined before it is assigned to the pixel.

Many factors may contribute to the color of the object struck by the original ray 440. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 440 intersected the object. For example, one type of secondary ray may be a shadow ray. A shadow ray may be used to determine the contribution of light to the point where the original ray 440 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 405. If the ray reaches the light source without encountering another object before the ray reaches the light source, then the light source will illuminate the object struck by the original ray at the point where the original ray struck the object.

For example, shadow ray $441_A$ may be issued from the point where original ray 440 intersected the object $420_A$, and may traverse in a direction towards the light source $425_A$. The shadow ray $441_A$ reaches the light source $425_A$ without encountering any other objects 420 within the scene 405. Therefore, the light source $425_A$ will illuminate the object $420_A$ at the point where the original ray 440 intersected the object $420_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $441_B$ may be issued from the point where the original ray 440 intersected with the object $420_A$, and may traverse in a direction towards the light source $425_B$. In this example, the path of the shadow ray $441_B$ is blocked by an object $420_D$. If the object $420_D$ is opaque, then the light source $425_B$ will not illuminate the object $420_A$ at the point where the original ray 440 intersected the object $420_A$. However, if the object $420_D$ which the shadow ray is translucent or transparent the light source $425_B$ may illuminate the object $420_A$ at the point where the original ray 440 intersected the object $420_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 444 is seen traversing through the object $420_A$ which the original ray 440 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 443 may be issued by the image processing system to determine what color or light may be reflected by the object $420_A$ which the original ray 440 intersected.

The total contribution of color and light of all secondary rays (e.g., shadow rays, transmitted rays, reflected rays, etc.) will result in the final color of the pixel through which the original ray passed.

An Exemplary kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 5A:
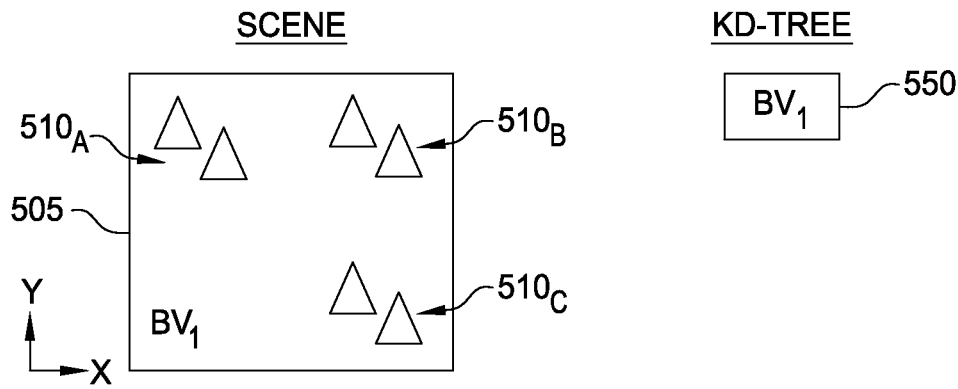
FIGS. 5A-5C illustrate a two-dimensional space to be rendered by an image processing system and a corresponding spatial index created by an image processing system, according to one embodiment of the invention.
Figure 5B:
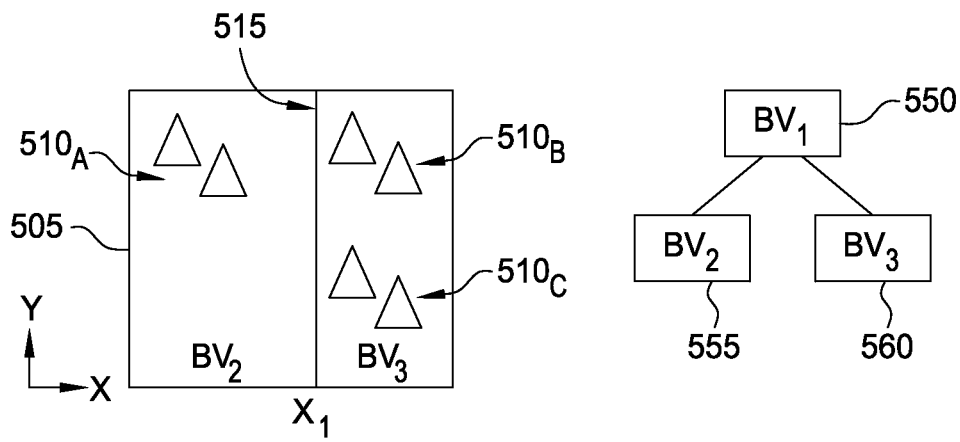
Figure 5C:
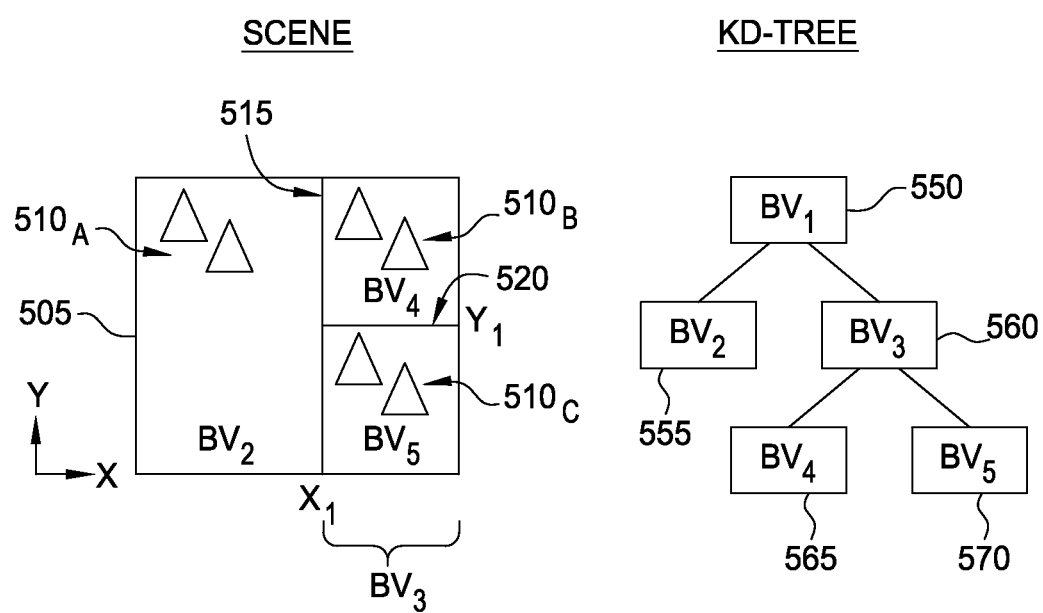

FIGS. 5A-5C illustrate a two-dimensional space to be rendered by an image processing system and a corresponding kd-tree. For simplicity, a two-dimensional scene is used to illustrate the building of a kd-Tree, however kd-Trees may also be used to represent three-dimensional scenes. In the two-dimensional illustration of FIGS. 5A-5C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 5A illustrates a two-dimensional scene 505 containing primitives 510 to be rendered in the final picture to be displayed on a monitor 510. The largest volume which represents the entire volume of the scene is encompassed by bounding volume 1 ($BV_1$). In the corresponding kd-Tree this may be represented by the top level node 550, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 5A, $BV_1$ contains six primitives, therefore kd-Tree construction algorithm may partition $BV_1$ into smaller bounding volumes.

FIG. 5B illustrates the same two-dimensional scene 505 as illustrated in FIG. 5A. However, in FIG. 5B the tree construction algorithm has partitioned $BV_1$ into two smaller bounding volumes $BV_2$ and $BV_3$. The partitioning of $BV_1$ was accomplished by drawing a splitting plane $SP_1$ 515 along the x-axis at point $x_1$. This partitioning of $BV_1$ is also reflected in the kd-Tree as the two nodes 555 and 560, corresponding to $BV_2$ and $BV_3$ respectively, under the internal or parent node $BV_1$ 550. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $510_A$). Nodes which are not partitioned or sub-divided any further, such as $BV_2$, are referred to as leaf nodes.

FIG. 5C illustrates the same two-dimensional scene 505 as illustrated in FIG. 5B. However, in FIG. 5C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 565 and 570, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $510_A$, leaf node $BV_4$ may contain pointers to primitives $510_B$, and leaf node $BV_5$ may contain pointers to primitives $510_C$.

The resulting kd-Tree structure, or other spatial index structure, may be stored in the shared memory cache 110. The kd-Tree and the size of corresponding data which comprises the kd-Tree may be optimized for storage in the shared memory cache 110.

Iterative Ray Tracing Algorithm

According to one embodiment of the invention, transforming the ray tracing algorithm from a recursive algorithm into an iterative algorithm may enable efficient distribution of workload related to ray tracing amongst a plurality of processing elements. An iterative ray tracing algorithm, in contrast to a recursive ray tracing algorithm, may allow separate processing elements to perform operations relating to determining the color of a single pixel and allow efficient use of processor resources (e.g., memory cache). Efficient distribution of workload amongst a plurality of processing elements may improve ray tracing image processing system performance.

An algorithm for performing ray tracing may be recursive in the sense that it issues an original ray into a three-dimensional scene and finishes all ray tracing operations relating to the issued original ray (e.g., traces all secondary rays and performs all ray-object intersection tests) before issuing a subsequent original ray into the three-dimensional scene.

For example, an image processing system may use a recursive ray tracing algorithm to render a two-dimensional image from a three-dimensional scene. The image processing system using a recursive ray tracing algorithm may use a processing element to perform ray tracing. The processor may be used to traverse a ray through a spatial index, and to determine if the ray intersects any objects within a bounding volume of the spatial index. If the ray intersects an object contained within a bounding volume, the image processing system, using the same processor, may issue secondary rays into the three-dimensional scene to determine if they intersect any objects and, consequently, contribute color to the object intersected by the original ray. While performing operations related to determining if the secondary rays intersect objects within the three-dimensional scene, the processor may store information defining the original ray in the processor's memory cache.

If the processing element determines that the secondary rays intersect objects within the three-dimensional scene the image processing element may issue more secondary rays into the scene to determine if those secondary rays intersect objects and contribute color to the object intersected by the original ray. When performing calculations to determine if the secondary rays intersect objects within the three-dimensional scene, the processor may store previous secondary ray information in the processor's memory cache. By issuing more and more secondary rays into the scene, the image processing system may finally determine the total contribution of color from secondary rays to the object intersected by the original ray. From the color of the object intersected by the original ray and the contribution of color due to secondary rays, the color of the pixel through which the original ray passed may be finally determined.

Although the recursive ray tracing algorithm determines the color of the pixel through which the original ray passed, each time the image processing system issues more secondary rays into the three-dimensional scene, the recursive ray tracing image processing system places information which defines the previous rays (e.g., the original ray or previous secondary rays) into the memory cache of the processing element. The image processing system may store ray information in the cache in order to free registers which may be necessary to perform the calculations related to determining if the subsequent secondary rays intersect objects within the three-dimensional scene. Consequently, the recursive ray tracing image processing system may place a large (relative to the size of the cache) amount of information into the processors memory cache for a single pixel.

By storing large amounts of ray information in the memory cache of the processor, there is little or no space in the processor's memory cache for information which defines the objects within the three-dimensional scene (i.e., object geometry data). This information may need to be frequently fetched from main memory into the memory cache in order to perform operations to determine if the original or secondary rays intersect objects within the three-dimensional scene (thereby "thrashing" the cache). Therefore, the limits of an image processing system which uses the recursive ray tracing technique may be limited by the access time to fetch information from main memory and place it in the processor's memory cache.

However, according to embodiments of the invention, the ray tracing algorithm may be partitioned into an iterative ray tracing algorithm. The iterative ray tracing algorithm may allow separate processing elements to perform portions of the ray tracing algorithm. By allowing separate processing elements to perform portions of the ray tracing algorithm, the amount of information which needs to be cached (e.g., original rays and secondary rays) may be reduced. Furthermore, according to embodiments of the invention, the iterative ray tracing algorithm may be used in conjunction with the low-latency high-bandwidth communications network and the shared memory cache 110 in order to improve the performance of a ray tracing image processing system.

The low-latency high-bandwidth communications network of inboxes, as described above with regards to FIGS. 3A-3C, may be used to pass or send data processing information (e.g., information defining original rays and secondary rays) which has little use when tracing subsequent rays or rendering subsequent frames, according to embodiments of the invention. In addition, according to embodiments of the invention, the ray tracing image processing system may use a shared coherent memory cache to store information which may be used by the image processing system when tracing subsequent rays or performing ray tracing for a subsequent frame.

Figure 6:
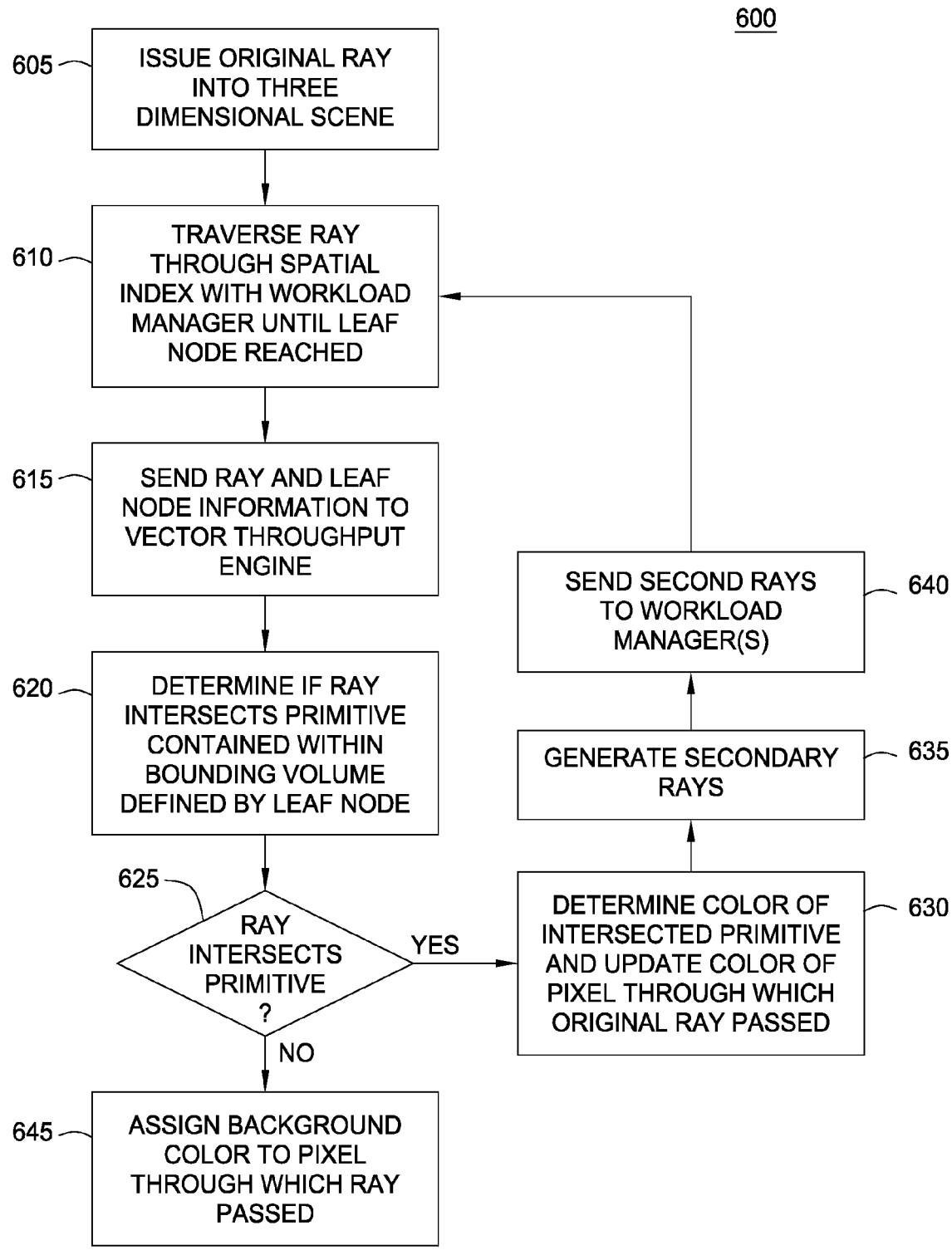
FIG. 6 is a flowchart illustrating a method of performing ray tracing, according to one embodiment of the invention.

FIG. 6 is a flowchart which illustrates a partitioned and thus iterative ray tracing algorithm or method 600 which may be used in a multi processor image processing system, according to one embodiment of the invention. The method 600 begins at step 605 when the image processing system issues an original ray into the three-dimensional scene. The original ray may pass through a pixel as it traverses into the three-dimensional scene. The original ray may be used to determine the color of the pixel through which the original ray passed.

Next, at step 610 the image processing system may use a use a workload manager 205 processing element to traverse the spatial index (e.g., kd-Tree). The spatial index may be stored within the shared memory cache 110 of the image processing system. Traversing the kd-Tree may include performing calculations which determine if the original ray intersects bounding volumes which are defined by nodes within the spatial index. Furthermore, traversing the spatial index may include taking branches to nodes which defined bounding volumes intersected by the ray. A workload manager 205 may use the coordinates and trajectory of an issued ray (e.g., the original ray) to determine if the ray intersects bounding volumes defined by the nodes in the spatial index. The workload manager 205 may continue traversing the spatial index until the original ray intersects a bounding volume which contains only primitives (i.e., a leaf node).

At step 615, after the workload manager 205 has traversed the original ray to a leaf node, the workload manager 205 may send the original ray and information which defines the leaf node to a vector throughput engine 210. The workload manager 205 may send information which defines the original ray and the leaf node (e.g., trajectory of the ray, pixel through which the original ray passed, bounding volume defined by the leaf node, etc.) to the vector throughput engine 210. The workload manager 205 may send the information to the vector throughput engine 210 by writing the information defining the ray and the intersected leaf node to the inbox of the vector throughput engine 210.

By coupling the pixel information with the information which defines the original ray, there is no need to send the original ray back to the workload manager 205 if the vector throughput engine 210 determines that the ray intersected an object and, consequently, determines a color of the pixel. According to one embodiment of the invention, the vector throughput engine 210 may use the pixel information to update the color of the pixel by writing to memory location within a frame buffer (e.g., stored in the shared memory cache 110) which corresponds to the pixel. By updating the pixel color as secondary rays intersect objects within the three-dimensional scene, the number of rays relating to the same pixel that need to be stored (e.g., in cache memory) may be reduced.

After the workload manager 205 sends the original ray information to the vector throughput engine 210, the image processing system may issue a subsequent original ray into the three-dimensional scene. The workload manager 205 may immediately begin traversing this subsequently issued original ray through the spatial index after the workload manager 205 has sent the original ray to a vector throughput engine 210. Thus, the workload manager 205 may be continuously traversing rays through the spatial index, rather than wait until the determination of whether the original ray intersected an object is complete, as in a recursive ray tracing algorithm. Furthermore, the workload manager 205 may be traversing rays through the spatial index as the vector throughput engine 210 is determining if previously issued rays intersect objects within the bounding volumes defined by leaf nodes. According to one embodiment of the invention, vector throughput engines 210 may be responsible for performing ray-primitive intersection tests. That is, the vector throughput engines 210 may determine if a ray intersects any primitives contained within the bounding volume defined by the leaf node.

Therefore, at step 620, a vector throughput engine 210 that receives the ray and leaf node information in its inbox may perform ray-primitive intersection tests to determine if the ray intersects any primitives within the bounding volume defined by the leaf node. The geometry which defines the primitives may be stored within the shared memory cache 114, and thus may not need to be fetched from main memory. By storing the geometry for primitives in the shared memory cache 110, the iterative ray tracing algorithm may not need to fetch the geometry from main memory as is the case with the recursive ray tracing algorithm. If the vector throughput engine 210 determines that the original ray intersected a primitive contained within the bounding volume defined by the leaf node, the vector throughput engine 210 may proceed to step 630.

At step 630, the vector throughput engine 210 may determine the color of the intersected primitive at the point which the original ray intersected the primitive. For example, the color of the primitive may be stored in the shared memory cache 114 and the vector throughput engine 210 may read the color information from the shared memory cache 210.

After determining the color of the primitive at the ray-primitive intersection point, the vector throughput engine 210 may update the color of pixel through which the ray passed. This may be accomplished, for example, by writing to a memory location within a frame buffer which corresponds to the pixel through which the original ray passed. By updating the pixel information as a ray-primitive intersection is determined and before determining the color contributions for all secondary rays relating to a original ray, the amount of information which may need to be stored in a memory cache may be reduced. In contrast, a recursive ray tracing algorithm may not store the color of the pixel in a frame buffer until all color contributions from secondary rays have been determined, which increases the amount of information which may need to be stored in a processor's memory cache.

After updating the pixel color, the vector throughput engine 210 may proceed to step 635, where, the vector throughput engine 210 may generate secondary rays. As described previously with regards to FIG. 4, a ray tracing image processing system may use secondary rays determine additional color contribution to the intersected object and thus to the pixel through which the original ray passed. Secondary rays may be, for example, reflected rays, transmitted (refracted) rays, or shadow rays. Generating secondary rays may include, for example, determining the trajectory of the secondary rays based on the trajectory of the original ray, surface properties of the intersected object, and an angle of intersection of the original ray with the intersected object.

After generating secondary rays, the vector throughput engine 210, at step 640 may send the secondary rays to a workload manager 205. The vector throughput engine 210 may send the secondary rays to a workload manager 205 by placing the information which defines the secondary rays (e.g., trajectory, information defining the pixel through which the original ray passed, etc.) in an inbox associated with a workload manager 205. According to one embodiment of the invention, the vector throughput engine 210 may send the secondary rays to the workload manager 205 which traversed the original ray through the spatial index. However, according to another embodiment of the invention, the image processing system may contain a plurality of workload managers and the vector throughput engine 210 may send the secondary rays to a workload manager which did not traverse the original ray through the spatial index.

After sending the secondary rays to a workload manager 205, the vector throughput engine 210 may retrieve other information defining rays from an inbox which may be waiting to have ray-primitive intersection tests performed. The rays waiting in the vector throughput engine's 210 inbox may have been previously traversed through a spatial index by a workload manager 205. Therefore, the vector throughput engine 210 may perform more ray-primitive intersection tests to determine if rays (i.e., original or secondary) intersect objects within bounding volumes defined by leaf nodes. Thus, the vector throughput engine 210 may continuously perform operations related to ray-primitive intersection tests, determining primitive colors, updating pixel colors, and generating secondary rays.

After receiving a secondary ray from a vector throughput engine 210, a workload manager 205 may execute steps 610 and 615, as described above, to determine if the secondary ray intersects a leaf node.

Returning to step 625, if the vector throughput engine 210 determines that the ray did not intersect a primitive contained within bounding volume defined by the leaf node, the vector throughput engine 210 may assign the pixel through which the original ray passed a background color of the three-dimensional scene. The background color may be assigned to the pixel because the original ray did not intersect any primitives contained within the three-dimensional scene. However, according to other embodiments of the invention, if the ray did not intersect any primitives contained within the leaf-node bounding volume, the vector throughput engine 210 may send the ray back to a workload manager 205 such that the workload manager 205 may traverse the ray through the spatial index again to determine if the ray intersected any other leaf nodes containing primitives.

Exemplary Use of an Iterative Ray Tracing Algorithm

Figure 7:
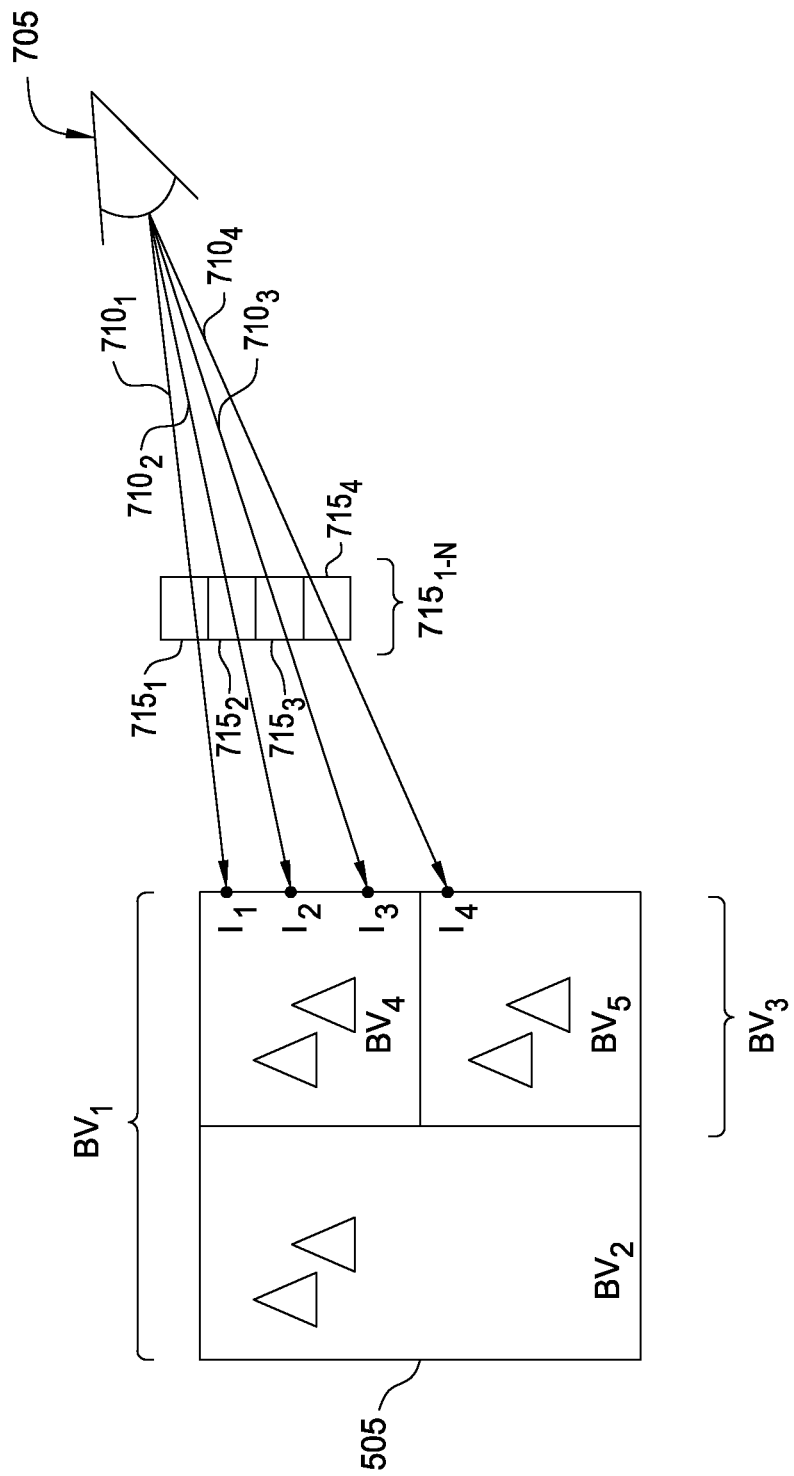
FIG. 7 is an exemplary three-dimensional space to be rendered by an image processing system, according to one embodiment of the invention.

FIG. 7 illustrates exemplary rays issued from an image processing system into a three-dimensional scene 505, according to one embodiment of the invention. For clarity, the three-dimensional scene 505 is the same as the three-dimensional scene used in FIGS. 5A-5C to illustrate the construction of a kd-tree. Therefore, the kd-tree which corresponds to the three-dimensional scene 505 is the same as the kd-tree which was constructed with regards FIGS. 5A-5C. As illustrated in FIG. 7, a viewer 705 represents the origin of a plurality of original rays $710_{1-4}$ which may be issued into the three-dimensional scene 505 by the image processing system. As each original ray $710_{1-4}$ is issued into the three-dimensional scene, the original rays may first pass through a corresponding pixel in a grid (frame) of pixels 715. Although only four pixels 715 and four original rays $710_{1-4}$ are illustrated in FIG. 7, to render a final two-dimensional image from a three-dimensional scene many more pixels may be necessary, and many more original rays may be issued.

A first original ray $710_1$ may be issued by the image processing system and pass through a first pixel $715_1$. The first original ray $710_1$ may intersect bounding volume 4 ($BV_4$) at an intersection point $I_1$. To facilitate understanding, the image processing system in this example may follow a pattern of issuing rays starting from the top of the grid of pixels 715 and continue issuing rays, one ray per pixel, moving down the grid of pixels until a ray has been issued for each pixel in the grid of pixels.

A second original ray $710_2$ and a third original ray $710_3$ may also be issued by the image processing system which may pass through a second pixel $715_2$ and a third pixel $715_3$ respectively. The second original ray $710_2$ and the third original ray $710_3$ may also intersect $BV_4$ at a second intersection point $I_2$ and a third intersection point $I_3$, respectively. Thus the first original ray $710_1$, the second original ray $710_2$, and the third original ray $710_3$ all intersect the same bounding volume. Furthermore, a fourth original ray $710_4$ may be issued by the image processing system and may pass through a fourth pixel $815_4$. The fourth original ray $710_4$, in contrast to the first three original rays $710_{1-3}$, may intersect bounding volume 5 ($BV_5$) at intersection point $I_4$.

FIG. 8A illustrates the traversal of the first original ray $710_1$ ray through a spatial index 805 (e.g., a kd-tree). Furthermore, as indicated by the shaded box 205, FIG. 8A illustrates a workload manager 205 performing operations related to the traversal of the first original ray $710_1$ through the spatial index 805. The workload manager 205 may traverse the ray through the spatial index 805 by taking branches to nodes defining bounding volumes intersected by the ray until a leaf node is reached (as illustrated in FIG. 8A by the darkened branches and nodes). As illustrated in FIG. 7 the original ray $710_1$ intersects $BV_4$, therefore, the workload manager 205 will traverse the first original ray $710_1$ to the leaf node which defines $BV_4$. After traversing the ray to a leaf node, the workload manager 205 may send the first original ray $710_1$ (e.g., send information which defines the first original ray $710_1$ and information which defines the pixel $715_1$ through which the first original ray passed) and information defining the intersected leaf node (i.e., $BV_4$) to a vector throughput engine 210.

According to embodiments of the invention, after the workload manager 205 sends the first original ray $710_1$ to a vector throughput engine 210, the workload manager 205 may begin traversing the second original ray $710_2$ through the spatial index. Thus, the workload manager 205 may be constantly traversing rays through the spatial index 805 while the vector throughput engines 210 are determining if rays intersect objects within the bounding volumes defined by traversed to leaf nodes.

Figure 8B:
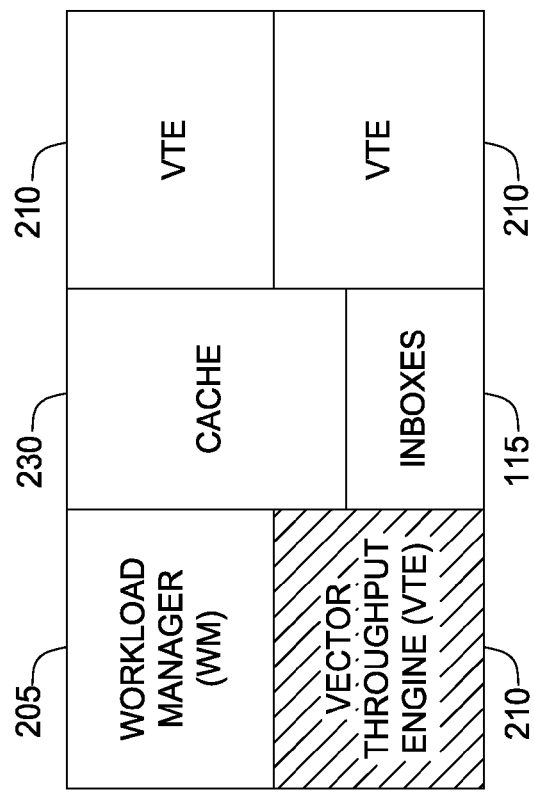
Figure 8B:
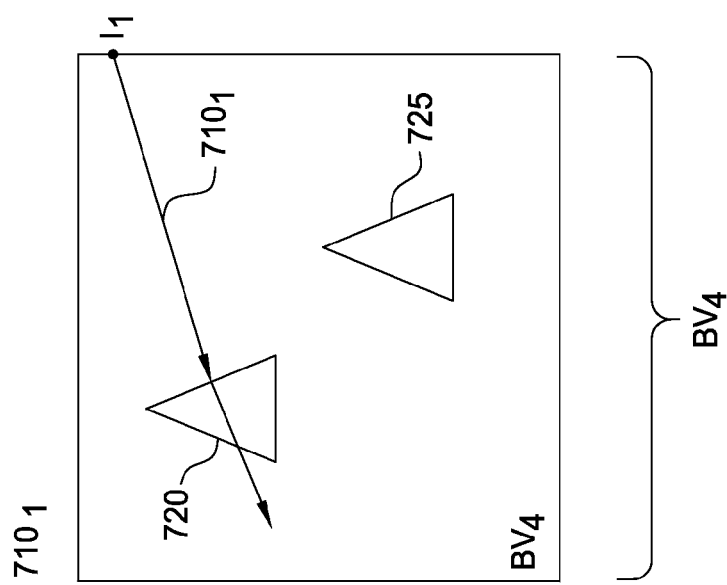

FIG. 8B illustrates the first original ray $710_1$ traversing through the bounding volume 4 (BV4). Furthermore, as indicated by the shaded box, FIG. 8B illustrates the vector throughput engine 210 performing ray-primitive intersection tests after the vector throughput engine has received the information defining the first original ray $710_1$ and the information defining the bounding volume $BV_4$ as described with regards to FIG. 6, the vector throughput engine 210 may execute ray-primitive intersection tests to determine if the original ray $710_1$ intersects primitives contained within the bounding volume $BV_4$.

The vector throughput engine 210 may perform tests with the first original ray $710_1$ against a first object 720 within the bounding volume $BV_4$, and against a second object 725 within the bounding volume $BV_4$. As illustrated in FIG. 8B, the vector throughput engine 210 may determine that the first original ray $710_1$ intersects the first object 720.

As described previously with respect to method 600, after determining that the first original ray $710_1$ intersects an object, the vector throughput engine 210 may determine the color of the first object 720 at the point which the first original ray $710_1$ intersected the first object 720. After determining the color of the object 720 at the intersection point, the vector throughput engine 210 may update the color of the pixel $715_1$ through which the first original ray $710_1$ passed (e.g., by writing to a frame buffer memory location which corresponds to the pixel $715_1$).

Figure 8C:
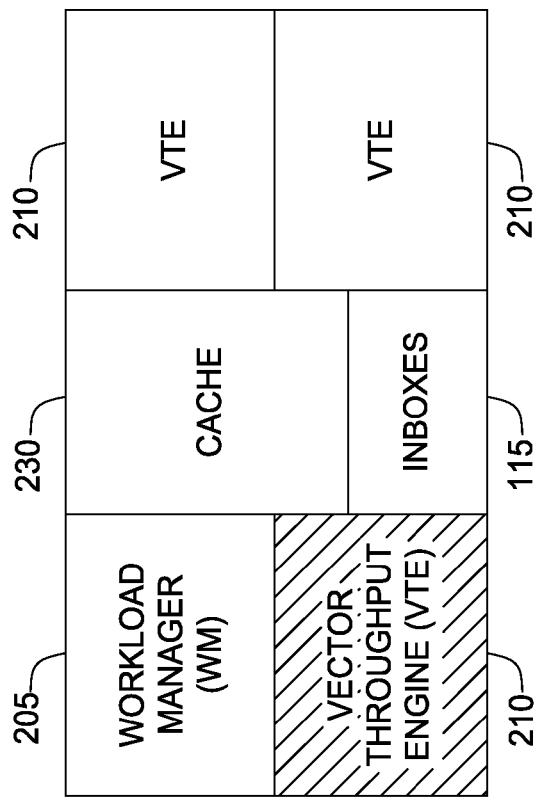
Figure 8C:
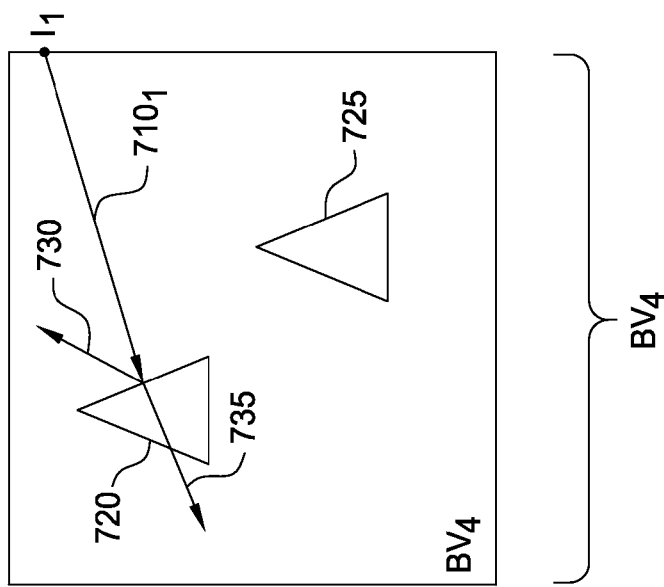

After determining the color of the object 720 at the intersection point, the vector throughput engine 210 may generate secondary rays. For example, as illustrated in FIG. 8C the vector throughput engine 210 may generate a reflected ray 730 and a transmitted (refracted) ray 735. Both secondary rays (730 and 735) originate from the point where the first original ray $710_1$ intersected the object 720. As described above, the secondary rays may be used to determine additional color contribution to the object at the point which the first original ray $710_1$ intersected the object 720. The generation of the secondary rays may include determining a trajectory for each secondary ray and tagging the secondary ray such that the additional color contribution from the secondary ray may be used to update the color of the pixel $715_1$ through which the first original ray $710_1$ passed.

After generating the secondary rays (730 and 735), the vector throughput engine 210 may send the secondary rays (730 and 735), via an inbox, to a workload manager 205. A workload manager 205 which receives the secondary rays (730 and 735) may use the information which defines the secondary rays (i.e., trajectory of secondary rays) to traverse the spatial index 805. For example, the shaded box in FIG. 8D illustrates a workload manager 205 which may traverse the spatial index 805 with a secondary ray (e.g., 730) which was generated by a vector throughput engine 210. The workload manager 205 may traverse the secondary ray to a leaf node. After the secondary ray has been traversed to a leaf node, the workload manager 205 may send the secondary ray and information defining the bounding volume intersected by the secondary ray to a vector throughput engine 210 to determine if the secondary ray intersects any objects with the bounding volume intersected by the secondary ray.

As the vector throughput engines 210 determine that the original ray or secondary rays strike objects within the three-dimensional scene, the color of the pixel through which the original ray passed may be updated within the frame buffer. According to embodiments of the invention, all secondary rays relating to an original ray, and thus to the pixel through which the original ray passed, may be traced through the three-dimensional scene and their color contributions saved in the frame buffer to determine the final color of the pixel. However, according to other embodiments of the invention, a finite number of secondary rays relating to the original ray may be traced through the three-dimensional scene to determine the color of the pixel. By limiting the number of secondary rays which are traced through the three-dimensional scene and thus contribute to the color of the pixel, the amount of processing necessary to determine a final color of the pixel may be reduced.

Two-Tiered Approach to Dynamic Load Balancing

Certain graphics algorithms are highly likely to be massively threaded, as well as, have limited "types" of threads. An example of a type of thread may be Real Time Ray Tracing or Physics Simulation. When applications are massively threaded, load balancing may become a problem. This is especially true with applications that have variable and unpredictable path lengths. For example, Thread A and Thread B may execute the same function, but Thread A may have a realized path length of 100 instructions, whereas Thread B may have a realized path length of 1000 instructions. Therefore, Thread A has a chance of sitting idle, and Thread B has a chance of becoming a bottleneck.

Where a processor provides multiple cores executing multiple threads, each thread may also be in competition with other threads for use of the processor's cache space. For example, because the cache space in the processor may be smaller than the computer's main memory, the cache space may not be large enough to hold all of the data and instructions for each thread being executed by each of the processing cores. Thus, when a given processing core switches from executing a first thread to executing a second thread, the data and instructions for the first thread may be removed from the cache and replaced with data and instructions for the second thread. If execution of the first thread is subsequently resumed, the first thread may again be paused while data and instructions for the first thread are retrieved from the main memory and placed back in the processor's caches. Pausing threads of execution while data and instructions are retrieved from the main memory may decrease efficiency of the processor.

Where multiple threads in the processor are accessing data and instructions from the main memory, the amount of data being transferred to and from the main memory (referred to as the consumed memory bandwidth) may increase significantly as each thread sends data to and from the main memory. When the consumed memory bandwidth is increased, each subsequent access by a thread may be performed slowly (e.g., slowly relative to individual accesses when the main memory is not being accessed by multiple threads, for example, when the consumed memory bandwidth is low) as other accesses are performed. As described above, threads waiting for a memory access to be performed may be paused, thereby decreasing efficiency of the processor.

Accessing of data and instructions by threads of execution may be further complicated where a given thread of execution attempts to access data and/or instructions of another thread of execution being executed by the processor. Where threads of execution share data and instructions with each other, it may be difficult to efficiently share the data and instructions in memory without removing other data and instructions in the processor's typically limited cache space. As described above, as data and instructions are removed from the processor's cache space, and as other data and instructions are retrieved from main memory, the consumed memory bandwidth as well as the access time may be increased, thereby decreasing efficiency of the processor.

Where threads of execution being executed by the processor pause too frequently, performance of applications being executed by the processor may also suffer. For example, as described above with respect to a video game which renders a three-dimensional sequence of an action being performed by the video game player, there may be a desire to have the action appear smoothly and without any pauses. However, where a thread performing the rendering pauses due to slow memory access caused, for example, to one of the situations described above, the sequence being rendered may suffer from pauses which result in an unsmooth action sequence.

To minimize the overhead of shared resource management, and at the same time, maximize the potential aggregate throughput of the thread pool, a two tiered method of dynamic load balancing may be implemented using sets of distributed thread pools. The two tiered method incorporates macro-dynamic load balancing with micro-dynamic load balancing.

Figure 9:
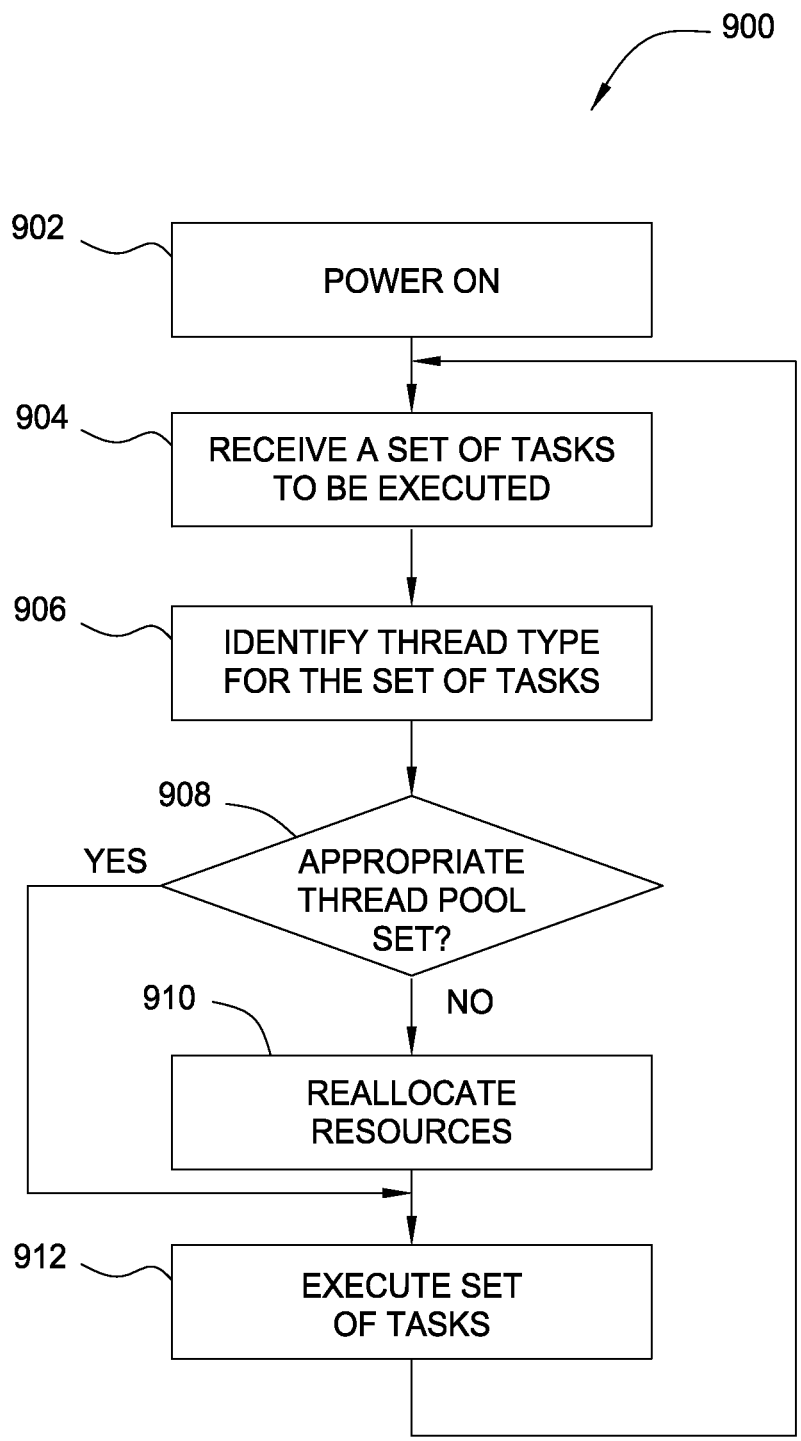
FIG. 9 is a flowchart illustrating a method of performing macro-dynamic load balancing.

FIG. 9 illustrates a first tier method 900 of performing macro-dynamic load balancing. The process begins, at 902, with a system in which the method is implemented being powered on. At 904, a processor receives a set of tasks to be executed. At 906, the processor identifies a thread type for the set of tasks it has recently received. At 908, the processor determines if there is an appropriate thread pool set corresponding to the thread type for the set of tasks. If there is not an appropriate thread pool set, the processor, at 910, reallocates system resources to establish an appropriate thread pool set. Reallocating system resources may include increasing or decreasing the number of thread pool sets, increasing or decreasing the size of each set, or increasing or decreasing the work flow to each set and is discussed further with reference to FIGS. 10A-10D. Finally, at 912, the processor executes the set of tasks and receives another set of task to be executed 904.

Figure 10A:
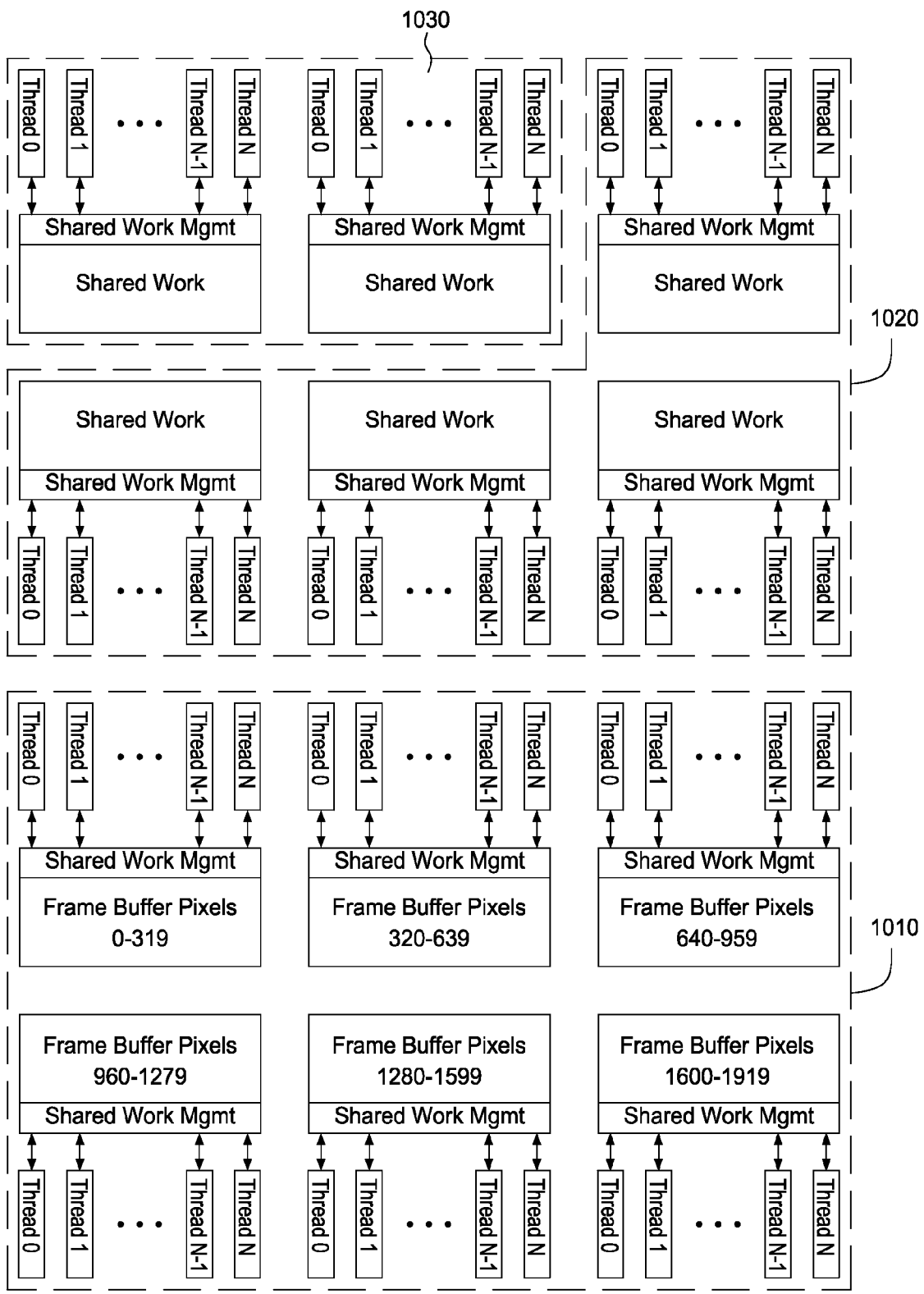
FIGS. 10A-10D illustrate several possible ways a system may employ macro-dynamic load balancing.

FIGS. 10A-10D illustrate several possible ways a processor may reallocate system resources. FIG. 10A depicts an example initial allocation of 12 processing cores between three thread pool sets. Element 1010 represents a thread pool set utilizing 6 processing cores which may be responsible for displaying real time ray tracing. Each processing core includes N threads located within. The work load for each processing core may include all of the corresponding tasks associated with displaying a selectively defined group of pixels. In the present example, each processing core within the thread pool set 1010 is responsible for displaying 320 pixels. However, the number of pixels each processing core is assigned may be selectively adjusted as dictated by a processor responsible for macro-dynamic load balancing. Elements 1020 and 1030 depict two other thread pool sets which are responsible for other types of threads. For example, thread pool set 1020 may be responsible for physics simulation, while thread pool set 1030 may be responsible for sound effects.

Figure 10B:
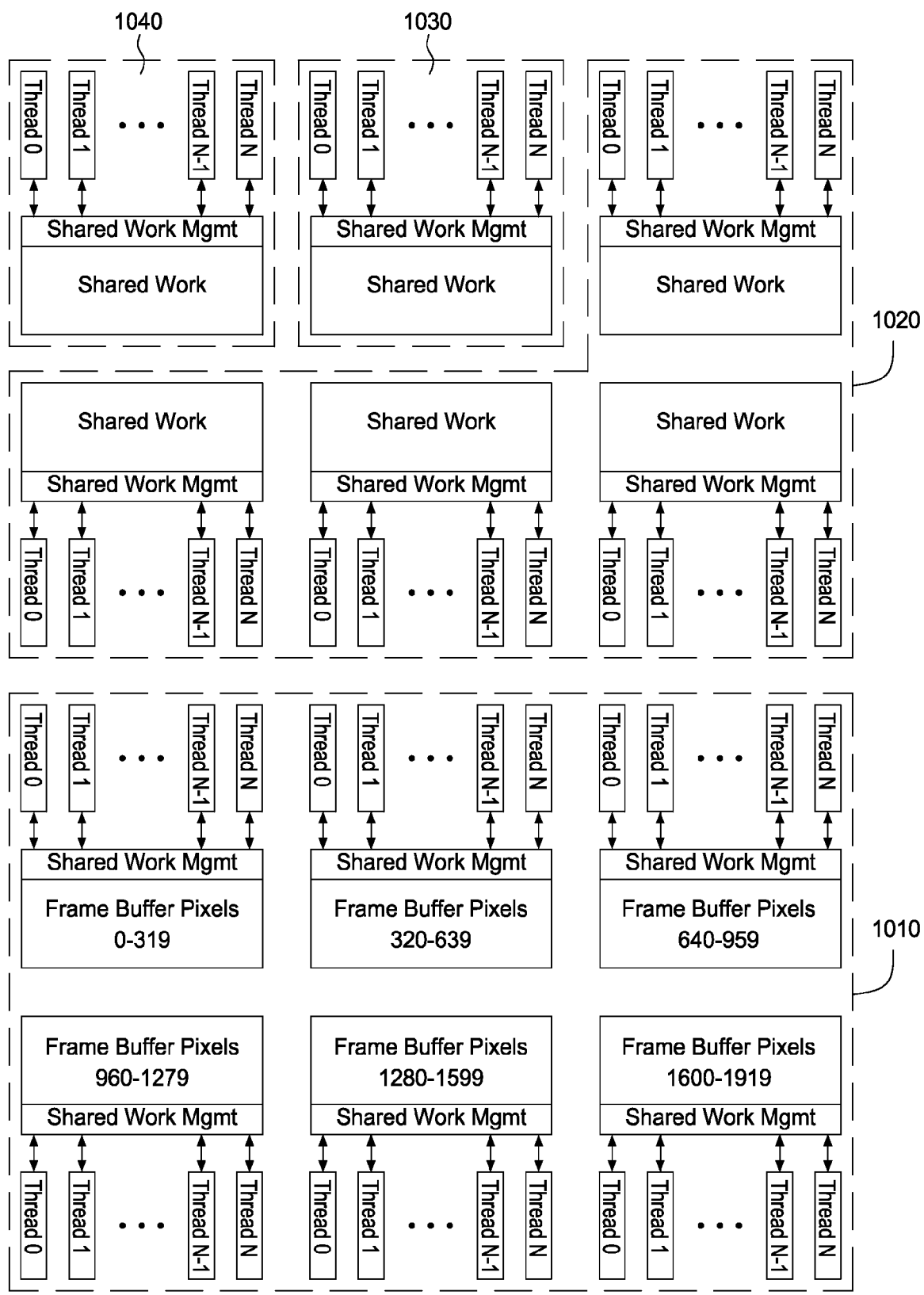
Figure 10C:
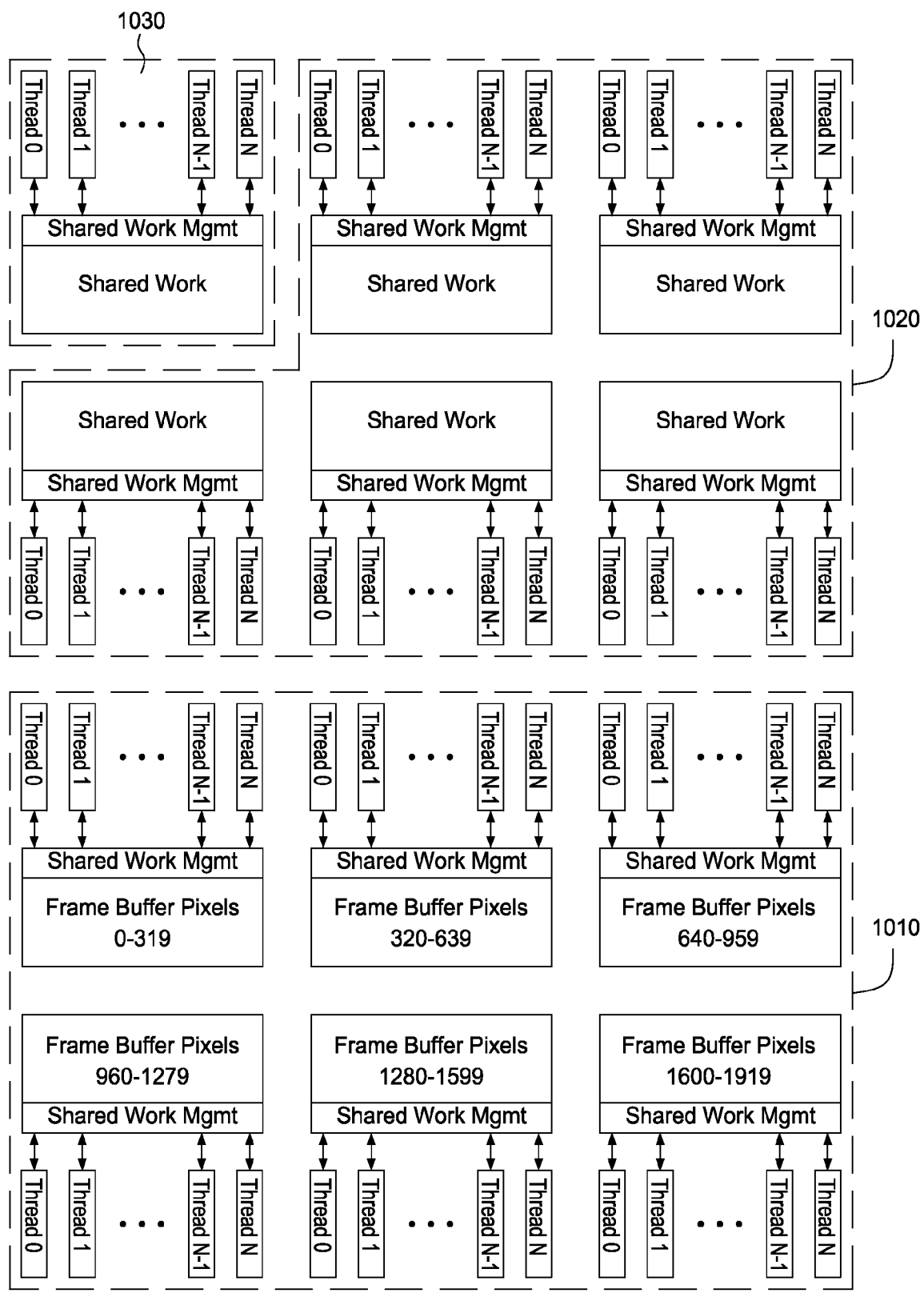
Figure 10D:
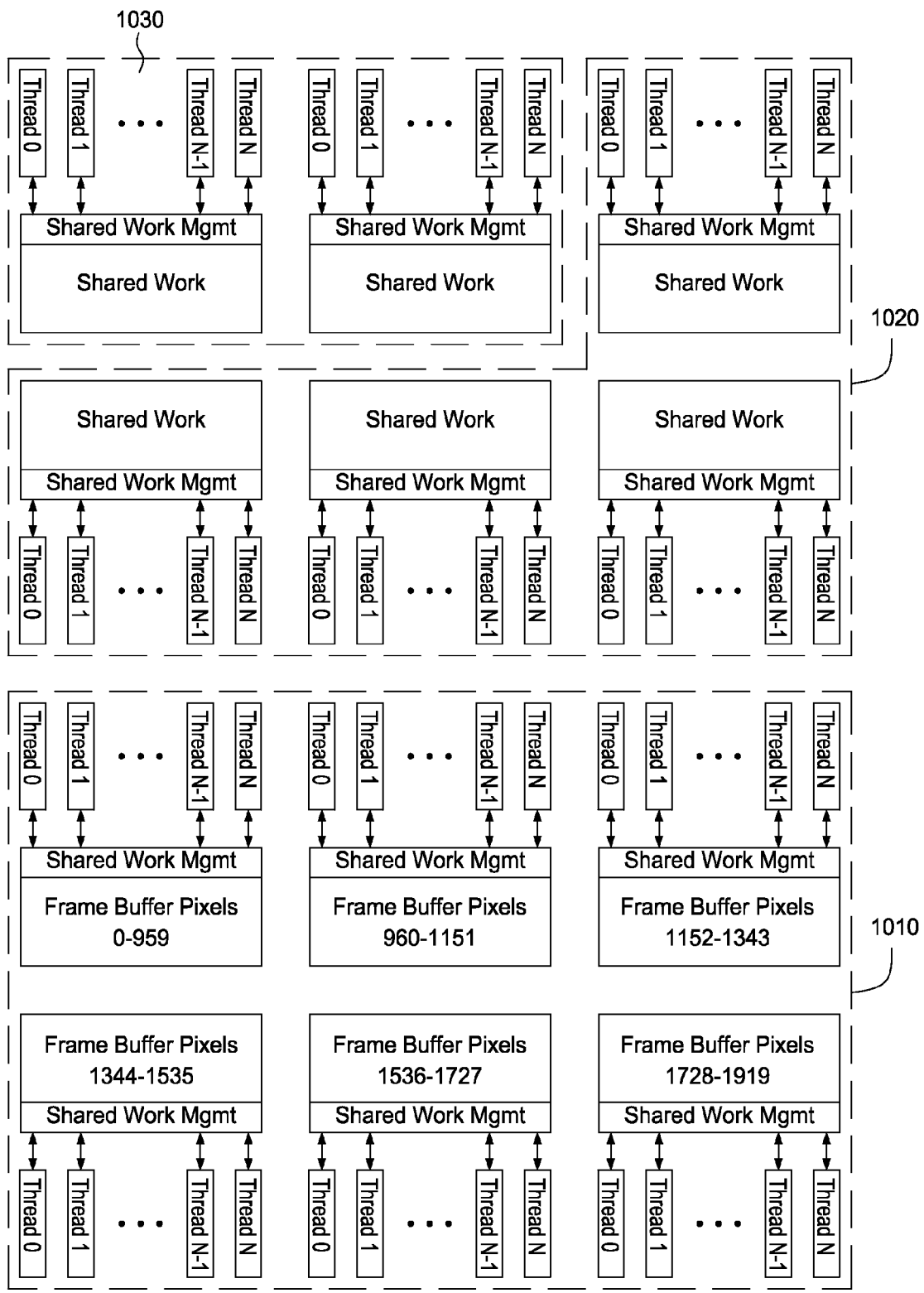

FIGS. 10B-10D show ways in which a processor may reallocate system resources. In FIG. 10B, the number of thread pool sets is increased with the addition of a thread pool set 1040. Assuming there are a finite number of processing cores in a system, the thread pool set 1040 may have been established by decreasing the number of processing cores (and consequently the number of threads) available to the thread pool set 1030. In FIG. 10C, the system resources are reallocated to increase the number of processing cores (and consequently the number of threads) available to thread pool set 1020. This may be done to balance the load on any given resource and attempt to ensure that all necessary tasks are promptly executed. For example, the complexity and volume of calculations in the physics simulation thread pool set may require additional processing power to ensure the results are available for the real time ray tracing thread pool set in a fashion timely enough to produce fluid motion on a display screen.

In FIG. 10D, the workload provided to a thread pool set is redistributed among the processing cores and corresponding threads within the thread pool set. In the current example, processing core 1010A is responsible for all of the corresponding tasks associated with displaying pixels 0-959, and the other 960 pixels are divided among the remaining 5 processing cores 1010B-F. However, in the initial allocation each processor was responsible for displaying 320 pixels. An uneven distribution of pixels among the processing cores may be done because one set of pixels has a slow change rate at a given point in time, while other sets of pixels have significantly higher change rates at the same point in time.

It should be noted that macro-dynamic load balancing may include other forms of reallocating system resources, as known by those knowledgeable in the art. Further, a number of system parameters may be monitored to indicate the need for a reallocation.

Figure 11:
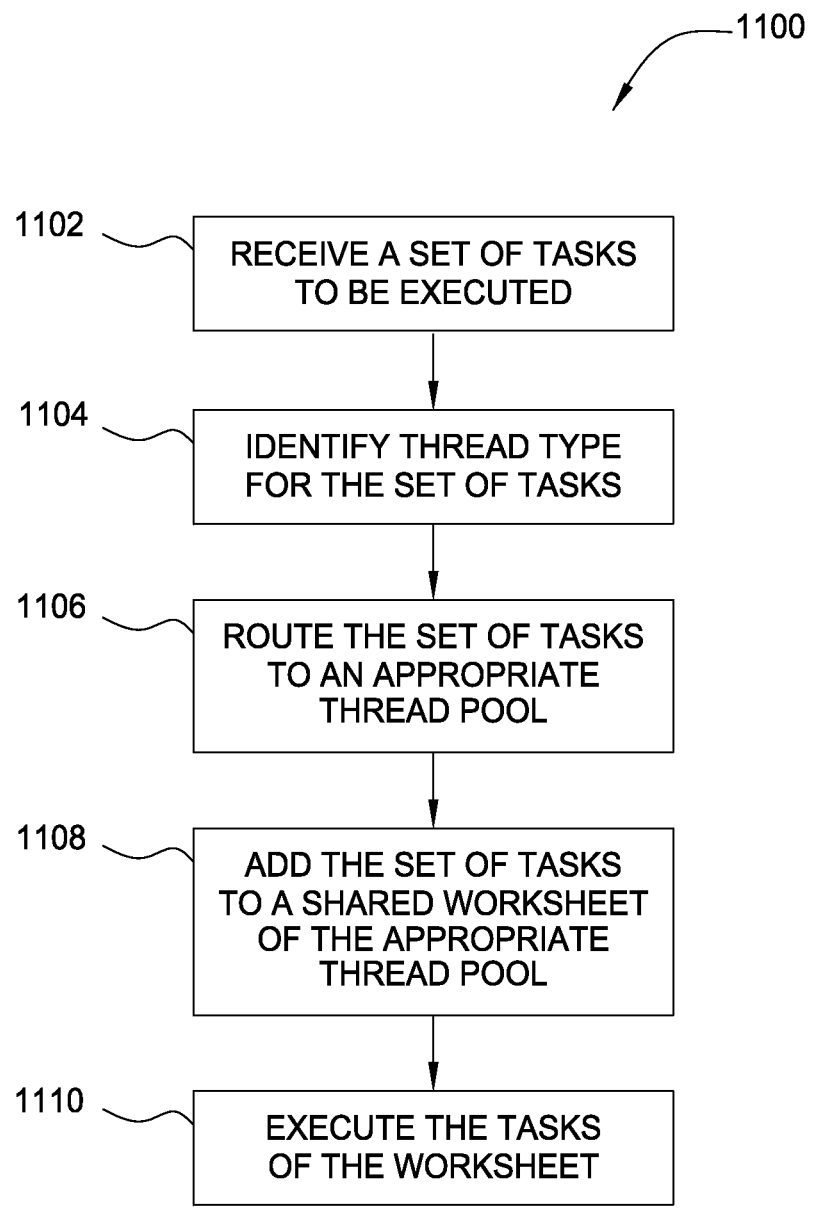
FIG. 11 is a flowchart illustrating a method of performing micro-dynamic load balancing.

FIG. 11 is a flowchart illustrating a second tier method 1100 of load balancing, micro-dynamic load balancing. The method begins, at 1102, with a processor receiving a set of tasks to be executed. At 1104, the processor identifies a thread type for the set of tasks it has recently received. At 1106, the processor routes the set of tasks to an appropriate thread pool set. At 1108, the set of tasks is added to a shared workset of the appropriate thread pool. For example, a shared workset may be a shared message queue to consume, or a shared section of a frame buffer to update (as seen in FIGS. 10A-10D), or any other conceivable shared work. Finally, at 1110, the tasks of the workset are executed by the associated threads.

The tasks of a workset are typically executed by time slicing, wherein a single processing core switches between different threads. However, more than one core may be employed in executing tasks of a single workset.

CONCLUSION

By employing a two-tier load balancing scheme the overhead of shared resource management is minimized, while the potential aggregate throughput of a thread pool is maximized, yielding increased performance in many computing environments, such as graphics intensive gaming. This is done by reallocating system resources among a plurality of thread pool sets and separating sets of tasks based on a thread type of each set of tasks. This allows a plurality of threads to execute similar sets of tasks while experiencing minimal idle time and mitigating the chance of tasks becoming bottlenecked.

What is claimed is:

1. A two-tiered method of load balancing, comprising:
   employing a first-tier macro-dynamic load balancing comprising:
      dividing a plurality of processing threads into a plurality of distributed thread pool sets, wherein each thread pool set comprises a respective number of threads;
      allocating system resources among the plurality of thread pool sets receiving a set of tasks to be executed, wherein the macro-dynamic load balancing allows for a non-uniform allocation of system resources among the plurality of thread pool sets;
      identifying a thread type for the set of tasks;
      determining if a thread pool set is available corresponding to the identified thread type for the set of tasks; and
      reallocating resources as necessary to ensure that an appropriate thread pool set is available for the identified thread type, wherein reallocating resources comprises modifying the respective number of threads in the appropriate thread pool set based a set of processing requirements of the set of tasks; and employing a second-tier micro-dynamic load balancing comprising:
      routing the set of tasks to the appropriate thread pool set based on the thread type;
      adding the set of tasks to a shared workset of the appropriate thread pool set; and
      executing the tasks of the shared workset.

2. The method of claim 1, wherein allocating system resources among the plurality of thread pool sets is based on one or more parameters of system performance, wherein allocating system resources within the plurality of thread pool sets is based on one or more parameters of system performance.

3. The method of claim 1, wherein reallocating system resources further comprises:
   decreasing a set of resources available to a thread pool set, thereby freeing up the set of system resources;
   creating a new thread pool set; and
   allocating the set of system resources previously freed up to the new thread pool set.

4. The method of claim 1, wherein reallocating resources further comprises:
   decreasing a set of resources available to a thread pool set, thereby freeing up the set of system resources; and
   allocating the set of system resources previously freed up to another, already existing, thread pool set.

5. The method of claim 1, wherein a first thread pool set of the plurality of thread pool sets comprises one or more threads configured to perform real-time ray tracing, wherein the first thread pool set comprises a first number of threads, wherein the first number of threads is based on a set of processing requirements of threads configured to perform real-time ray tracing.

6. The method of claim 5, wherein a second thread pool set of the plurality of thread pool sets comprises one or more threads configured to perform physics simulations, wherein the second thread pool set comprises a second number of threads, wherein the second number of threads is different than the first number of threads, wherein the second number of threads is based on a set of processing requirements of threads configured to perform physics simulations.

7. The method of claim 6, wherein a third thread pool set of the plurality of thread pool sets comprises one or more threads configured to process sound effects, wherein the third thread pool set comprises a third number of threads, wherein the third number of threads is different than the first number of threads and the second number of threads, wherein the third number of threads is based on a set of processing requirements of threads configured to process sound effects.

8. A processor comprising:
a set of processing resources; and
scheduling logic for performing two-tiered load balancing, wherein the scheduling logic is configured to:
employ a first-tier macro-dynamic load balancing comprising:
dividing a plurality of processing threads into a plurality of distributed thread pool sets, wherein each thread pool set comprises a respective number of threads;
allocating system resources among the plurality of thread pool sets receiving a set of tasks to be executed, wherein the macro-dynamic load balancing allows for a non-uniform allocation of system resources among the plurality of thread pool sets;
identifying a thread type for the set of tasks;
determining if a thread pool set is available corresponding to the identified thread type for the set of tasks; and
reallocating resources as necessary to ensure that an appropriate thread pool set is available for the identified thread type, wherein reallocating resources comprises modifying the respective number of threads in the appropriate thread pool set based a set of processing requirements of the set of tasks; and
employ a second-tier micro-dynamic load balancing comprising:
routing the set of tasks to the appropriate thread pool set based on the thread type;
adding the set of tasks to a shared workset of the appropriate thread pool set; and
executing the tasks of the shared workset.

9. The processor of claim 8, wherein the scheduling logic is configured to allocate processing resources among the plurality of thread pool sets is based on one or more parameters of system performance, wherein allocating system resources within the plurality of thread pool sets is based on one or more parameters of system performance.

10. The processor of claim 8, wherein the scheduling logic is configured to further reallocate processing resources by:
decreasing a set of processing resources available to a thread pool set, thereby freeing up the set of processing resources;
creating a new thread pool set; and
allocating the set of processing resources previously freed up to the new thread pool set.

11. The processor of claim 8, wherein the scheduling logic is configured to further reallocate processing resources by:
decreasing a set of resources available to a thread pool set, thereby freeing up the set of system resources; and
allocating the set of system resources previously freed up to another, already existing, thread pool set.

12. The processor of claim 8, wherein a first thread pool set of the plurality of thread pool sets comprises one or more threads configured to perform real-time ray tracing, wherein the first thread pool set comprises a first number of threads, wherein the first number of threads is based on a set of processing requirements of threads configured to perform real-time ray tracing.

13. The processor of claim 12, wherein a second thread pool set of the plurality of thread pool sets comprises one or more threads configured to perform physics simulations, wherein the second thread pool set comprises a second number of threads, wherein the second number of threads is different than the first number of threads, wherein the second number of threads is based on a set of processing requirements of threads configured to perform physics simulations.

14. The processor of claim 13, wherein a third thread pool set of the plurality of thread pool sets comprises one or more threads configured to process sound effects, wherein the third thread pool set comprises a third number of threads, wherein the third number of threads is different than the first number of threads and the second number of threads, wherein the third number of threads is based on a set of processing requirements of threads configured to process sound effects.

15. A graphics processing system for load balancing, comprising:
one or more computer processors; and
a memory containing a program which, when executed by the one or more computer processors, is configured to perform an operation comprising:
processing resources for processing threads for generating graphics; and
scheduling logic for performing two-tiered load balancing, wherein the scheduling logic is configured to:
employ a first-tier macro-dynamic load balancing
employ a first-tier macro-dynamic load balancing comprising:
dividing a plurality of processing threads into a plurality of distributed thread pool sets, wherein each thread pool set comprises a respective number of threads;
allocating system resources among the plurality of thread pool sets receiving a set of tasks to be executed, wherein the macro-dynamic load balancing allows for a non-uniform allocation of system resources among the plurality of thread pool sets;
identifying a thread type for the set of tasks;
determining if a thread pool set is available corresponding to the identified thread type for the set of tasks; and
reallocating resources as necessary to ensure that an appropriate thread pool set is available for the identified thread type, wherein reallocating resources comprises modifying the respective number of threads in the appropriate thread pool set based a set of processing requirements of the set of tasks; and
employ a second-tier micro-dynamic load balancing comprising:
routing the set of tasks to the appropriate thread pool set based on the thread type;
adding the set of tasks to a shared workset of the appropriate thread pool set; and
executing the tasks of the shared workset.

16. The system of claim 15, wherein the scheduling logic is configured to allocate processing resources among the plurality of thread pool sets is based on one or more parameters of system performance, wherein allocating system resources within the plurality of thread pool sets is based on one or more parameters of system performance.

17. The system of claim 15, wherein the scheduling logic is configured to further reallocate processing resources by:
- decreasing a set of processing resources available to a thread pool set, thereby freeing up the set of processing resources;
- creating a new thread pool set; and
- allocating the set of processing resources previously freed up to the new thread pool set.

18. The system of claim 15, wherein the scheduling logic is configured to further reallocate processing resources by:
- decreasing a set of resources available to a thread pool set, thereby freeing up the set of system resources; and
- allocating the set of system resources previously freed up to another, already existing, thread pool set.

19. The system of claim 15, wherein a first thread pool set of the plurality of thread pool sets comprises one or more threads configured to perform real-time ray tracing, wherein the first thread pool set comprises a first number of threads, wherein the first number of threads is based on a set of processing requirements of threads configured to perform real-time ray tracing.

20. The system of claim 19, wherein a second thread pool set of the plurality of thread pool sets comprises one or more threads configured to perform physics simulations, wherein the second thread pool set comprises a second number of threads, wherein the second number of threads is different than the first number of threads, wherein the second number of threads is based on a set of processing requirements of threads configured to perform physics simulations, wherein a third thread pool set of the plurality of thread pool sets comprises one or more threads configured to process sound effects, wherein the third thread pool set comprises a third number of threads, wherein the third number of threads is different than the first number of threads and the second number of threads, wherein the third number of threads is based on a set of processing requirements of threads configured to process sound effects.

* * * * *